United States Patent
Kihara et al.

(10) Patent No.: US 8,488,945 B2
(45) Date of Patent: Jul. 16, 2013

(54) RECORDING APPARATUS, METHOD FOR CONTROLLING RECORDING APPARATUS, CONTROL PROGRAM OF RECORDING APPARATUS, AND COMPUTER-READABLE RECORDING MEDIUM

(75) Inventors: Shinjiro Kihara, Chiba (JP); Takahiro Maeda, Chiba (JP); Yukitaka Shimizu, Narashino (JP); Ryouichi Wakabayashi, Tokyo (JP); Satoshi Saito, Narashino (JP)

(73) Assignee: Sharp Kabushiki Kaisha, Osaka (JP)

( * ) Notice: Subject to any disclaimer, the term of this patent is extended or adjusted under 35 U.S.C. 154(b) by 1272 days.

(21) Appl. No.: 12/090,344

(22) PCT Filed: Oct. 17, 2006

(86) PCT No.: PCT/JP2006/320673
§ 371 (c)(1),
(2), (4) Date: Apr. 15, 2008

(87) PCT Pub. No.: WO2007/046387
PCT Pub. Date: Apr. 26, 2007

(65) Prior Publication Data
US 2009/0263109 A1      Oct. 22, 2009

(30) Foreign Application Priority Data
Oct. 17, 2005 (JP) .................. 2005-302365

(51) Int. Cl.
*H04N 5/92* (2006.01)
(52) U.S. Cl.
USPC .......................... 386/326; 386/239

(58) Field of Classification Search
USPC ............................. 386/46, 326, 239
See application file for complete search history.

(56) References Cited

U.S. PATENT DOCUMENTS

| | | |
|---|---|---|
| 6,594,740 B1 | 7/2003 | Fukuda |
| 6,920,281 B1 * | 7/2005 | Agnibotri et al. ............. 386/295 |
| 7,062,158 B1 * | 6/2006 | Ayaki ............................ 386/248 |
| 7,181,128 B1 | 2/2007 | Wada et al. |
| 7,353,541 B1 * | 4/2008 | Ishibashi et al. ................ 726/26 |
| 2002/0065841 A1 * | 5/2002 | Matsuda et al. ............. 707/206 |

(Continued)

FOREIGN PATENT DOCUMENTS

| | | |
|---|---|---|
| CN | 1677547 A | 10/2005 |
| EP | 1143720 A1 | 10/2001 |

(Continued)

OTHER PUBLICATIONS

"Windows Operating System Screenshots" (Aug. 2011) by Examiner; 6 pages; documented assemted from various screenshots.*

*Primary Examiner* — Peter Shaw
*Assistant Examiner* — Ali Shayanfar
(74) *Attorney, Agent, or Firm* — Birch, Stewart, Kolasch & Birch, LLP

(57) ABSTRACT

A recording/reproducing apparatus (115) includes a storage section (117) having a content attribute database (DB1) and a point database (DB2). Further, a point calculating section (120) of the recording/reproducing apparatus (115) extracts attribute information sets for each content item from the content attribute database (DB1). Further, deletion factor points associated with deletion factors corresponding to the extracted attribute information sets are extracted from the point database (DB2) for each content item, and evaluation points are calculated in accordance with the extracted plural deletion factor points. This allows the user to appropriately reserve a space required in a recording medium.

19 Claims, 19 Drawing Sheets

U.S. PATENT DOCUMENTS

| | | | |
|---|---|---|---|
| 2002/0126553 A1 | 9/2002 | Denda et al. | |
| 2003/0191936 A1* | 10/2003 | Kawatsura et al. | 713/156 |
| 2003/0198462 A1* | 10/2003 | Bumgardner et al. | 386/83 |
| 2005/0084236 A1 | 4/2005 | Itoh | |
| 2005/0196129 A1 | 9/2005 | Kobayashi | |
| 2005/0213448 A1 | 9/2005 | Takahashi | |
| 2005/0232593 A1* | 10/2005 | Kanai | 386/94 |
| 2006/0212405 A1* | 9/2006 | Gordon et al. | 705/59 |

FOREIGN PATENT DOCUMENTS

| | | |
|---|---|---|
| JP | 11-127396 A | 5/1999 |
| JP | 11-242873 A | 9/1999 |
| JP | 2001-101793 A | 4/2001 |
| JP | 2001-160260 A | 6/2001 |
| JP | 2001-160264 A | 6/2001 |
| JP | 2002-033983 A | 1/2002 |
| JP | 2002-268923 A | 9/2002 |
| JP | 2003-217264 A | 7/2003 |
| JP | 2004-39003 A | 2/2004 |
| JP | 2004-303368 A | 10/2004 |
| JP | 2004-328591 A | 11/2004 |
| JP | 2005-151531 A | 6/2005 |
| JP | 2005-234609 A | 9/2005 |
| JP | 2005-251344 A | 9/2005 |
| JP | 2005-260562 A | 9/2005 |
| WO | WO-02/03682 A2 | 1/2002 |
| WO | WO-2004/070725 A1 | 8/2004 |

* cited by examiner

FIG. 3(a)

| DELETION CANDIDATE LIST | | | |
|---|---|---|---|
| TITLE | RECORDING DATE | RECORDING TIME | REPRODUCTION FLAG |
| CONTENT ITEM A | 2005.4.09 | 30 MINUTES | OFF |
| CONTENT ITEM B | 2005.4.19 | 30 MINUTES | OFF |
| CONTENT ITEM C | 2005.4.21 | 30 MINUTES | OFF |
| CONTENT ITEM D | 2005.4.22 | 60 MINUTES | OFF |
| CONTENT ITEM E | 2005.4.22 | 60 MINUTES | OFF |

FIG. 3(b)

| DELETION CANDIDATE LIST | | | |
|---|---|---|---|
| TITLE | RECORDING DATE | RECORDING TIME | REPRODUCTION FLAG |
| CONTENT ITEM A | 2005.4.09 | 30 MINUTES | OFF |
| CONTENT ITEM B | 2005.4.19 | 30 MINUTES | ON |
| CONTENT ITEM C | 2005.4.21 | 30 MINUTES | OFF |
| CONTENT ITEM D | 2005.4.22 | 60 MINUTES | OFF |
| CONTENT ITEM E | 2005.4.22 | 60 MINUTES | OFF |

EXAMPLE OF RESERVED TITLE

| TITLE | RECORDING DATE | RECORDING TIME |
|---|---|---|
| CONTENT ITEM F | 2005.5.01 10:00~10:30 | 30 MINUTES |
| CONTENT ITEM G | 2005.5.08 10:00~10:30 | 30 MINUTES |
| CONTENT ITEM H | 2005.5.15 10:00~10:30 | 30 MINUTES |
| CONTENT ITEM I | 2005.5.22 10:00~10:30 | 30 MINUTES |
| CONTENT ITEM J | 2005.5.30 10:00~10:30 | 30 MINUTES |

SCREEN DISPLAY

FIG. 6(a)

SCREEN DISPLAY

SELECT CONTENT ITEM TO BE DELETED

REMAINING SPACE: 0 MINUTE　　NECESSARY SPACE: 150 MINUTES　　FOR ALL TIMER RECORDING

- CONTENT ITEM B　30 MINUTES　※
- CONTENT ITEM A　30 MINUTES　※
- CONTENT ITEM C　30 MINUTES　※
- CONTENT ITEM D　30 MINUTES　※
- CONTENT ITEM E　30 MINUTES　※

FIG. 6(b)

SCREEN DISPLAY

SELECT CONTENT ITEM TO BE DELETED

REMAINING SPACE: 0 MINUTE　　NECESSARY SPACE: 150 MINUTES　　FOR ALL TIMER RECORDING

- CONTENT ITEM B　30 MINUTES
- CONTENT ITEM A　30 MINUTES
- CONTENT ITEM C　30 MINUTES
- CONTENT ITEM D　30 MINUTES
- CONTENT ITEM E　30 MINUTES

EXAMPLE OF RESERVED TITLE

| TITLE | RECORDING DATE | RECORDING TIME | RECORDING MODE |
|---|---|---|---|
| CONTENT ITEM I | 2005.5.01 10:00~10:30 | 30 MINUTES | EVERY WEEK |
| CONTENT ITEM J | 2005.5.06 17:00~17:30 | 30 MINUTES | ONE-TIME-ONLY |
| CONTENT ITEM K | 2005.5.01 13:00~14:00 | 60 MINUTES | EVERYDAY |

SCREEN DISPLAY

FIG. 13

| ■RECOMMENDED DELETION LIST | | 2/26[Thu] 9:00 A.M |
|---|---|---|
| DATE UNTIL WHEN TIMER RECORDING IS POSSIBLE: 12/30 | REMAINING TIME AFTER DELETION HD 123 HOURS 45 MINUTES | |

BS　１０３　　　　PROGRAM TITLE DISPLAY SPACE/40 LETTERS (FULL SIZE)
J TELEVISION　h　　　１２３４５６７８９０１２３４５６７８９０
12/30[Sun] 10:00 P.M　　　200 MINUTES [FINE]

[ NEW ORDER ]　　　　　　　　　　　　　　　　7/100 IN TOTAL △

| | | | |
|---|---|---|---|
| NEW | 7　TAHITI | 1/31[Sut] | 20 MINUTES |
| | 8　HIGH-VISION SPECIAL 「‥‥ | 1/30[Fri] | 30 MINUTES |
| | 9　WATERSCAPE | 1/27[Tue] | 30 MINUTES |
| | 10　TRIP IN JAPAN | 1/23[Fri] | 20 MINUTES |
| NEW | 11　BOTANICAL BOOK | 1/12[Mon] | 15 MINUTES |
| | 12　BOTANICAL BOOK | 1/5[Mon] | 15 MINUTES |

▽

MAKE SELECTION WITH ◁▷ AND PUSH (ENTER)　　　FINISH BY PUSHING (END)

FIG. 14

| REPRODUCTION FLAG | ON | | OFF | |
|---|---|---|---|---|
| | 30 point | | 0 point | |
| RECORDING TIME | ~30 MINUTES | 30~60 MINUTES | 60 MINUTES~ | |
| | 5 point | 10 point | 20 point | |
| RECORDING DATE | ON OR BEFORE APRIL 20, 2005 | | ON OR AFTER APRIL 21, 2005 | |
| | 50 point | | 0 point | |
| CONTENT IMPORTANCE LEVEL | FIRST RANK | SECOND RANK | THIRD RANK | |
| | 5 point | 10 point | 30 point | |

FIG. 17(a)

| DELETION CANDIDATE LIST ||||||
|---|---|---|---|---|---|
| TITLE | RECORDING DATE | REGULAR REGION IN-USE SPACE | SECURE REGION IN-USE SPACE | REPRODUCTION FLAG | CONTENT IMPORTANCE LEVEL |
| CONTENT ITEM A | 2006.03.10 | 7GB | 0MB | OFF | SECOND LEVEL |
| CONTENT ITEM B | 2006.03.20 | 3GB | 0MB | ON | THIRD LEVEL |
| CONTENT ITEM C | 2006.04.10 | 3GB | 5MB | OFF | THIRD LEVEL |
| CONTENT ITEM D | 2006.04.20 | 3GB | 15MB | ON | SECOND LEVEL |
| CONTENT ITEM E | 2006.04.30 | 7GB | 15MB | OFF | FIRST LEVEL |

FIG. 17(b)

| DELETION CANDIDATE LIST ||||||
|---|---|---|---|---|---|
| TITLE | RECORDING DATE | REGULAR REGION IN-USE SPACE | SECURE REGION IN-USE SPACE | REPRODUCTION FLAG | CONTENT IMPORTANCE LEVEL |
| CONTENT ITEM B | 2006.03.20 | 3GB | 0MB | ON | THIRD LEVEL |
| CONTENT ITEM C | 2006.04.10 | 3GB | 5MB | OFF | THIRD LEVEL |
| CONTENT ITEM A | 2006.03.10 | 7GB | 0MB | OFF | SECOND LEVEL |
| CONTENT ITEM D | 2006.04.20 | 3GB | 15MB | ON | SECOND LEVEL |
| CONTENT ITEM E | 2006.04.30 | 7GB | 15MB | OFF | FIRST LEVEL |

FIG. 18

| REPRODUCTION FLAG | ON | | OFF | |
|---|---|---|---|---|
| | 30 point | | 0 point | |
| REGULAR REGION IN-USE SPACE | ~5GB | 5~10GB | | 10GB~ |
| | 5 point | 10 point | | 20 point |
| SECURE REGION IN-USE SPACE | 0MB | 0~10MB | | 10MB~ |
| | 0 point | 10 point | | 20 point |
| RECORDING DATE | ON OR BEFORE MARCH 13, 2006 | | ON OR AFTER APRIL 1, 2006 | |
| | 50 point | | 0 point | |
| CONTENT IMPORTANCE LEVEL | FIRST RANK | SECOND RANK | | THIRD RANK |
| | 5 point | 10 point | | 30 point |

FIG. 19(a)

| DELETION CANDIDATE LIST | | | | | |
|---|---|---|---|---|---|
| TITLE | RECORDING DATE | REGULAR REGION IN-USE SPACE | SECURE REGION IN-USE SPACE | REPRODUCTION FLAG | CONTENT IMPORTANCE LEVEL |
| CONTENT ITEM B | 2006.03.20 | 3GB | 0MB | ON | THIRD LEVEL |
| CONTENT ITEM A | 2006.03.10 | 7GB | 0MB | OFF | SECOND LEVEL |
| CONTENT ITEM C | 2006.04.10 | 3GB | 5MB | OFF | THIRD LEVEL |
| CONTENT ITEM E | 2006.04.30 | 7GB | 15MB | OFF | FIRST LEVEL |
| CONTENT ITEM D | 2006.04.20 | 3GB | 15MB | ON | SECOND LEVEL |

FIG. 19(b)

| DELETION CANDIDATE LIST | | | | | |
|---|---|---|---|---|---|
| TITLE | RECORDING DATE | REGULAR REGION IN-USE SPACE | SECURE REGION IN-USE SPACE | REPRODUCTION FLAG | CONTENT IMPORTANCE LEVEL |
| CONTENT ITEM D | 2006.04.20 | 3GB | 15MB | ON | SECOND LEVEL |
| CONTENT ITEM E | 2006.04.30 | 7GB | 15MB | OFF | FIRST LEVEL |
| CONTENT ITEM C | 2006.04.10 | 3GB | 5MB | OFF | THIRD LEVEL |
| CONTENT ITEM B | 2006.03.20 | 3GB | 0MB | ON | THIRD LEVEL |
| CONTENT ITEM A | 2006.03.10 | 7GB | 0MB | OFF | SECOND LEVEL |

FIG. 19(c)

| DELETION CANDIDATE LIST | | | | | |
|---|---|---|---|---|---|
| TITLE | RECORDING DATE | REGULAR REGION IN-USE SPACE | SECURE REGION IN-USE SPACE | REPRODUCTION FLAG | CONTENT IMPORTANCE LEVEL |
| CONTENT ITEM E | 2006.04.30 | 7GB | 15MB | OFF | FIRST LEVEL |
| CONTENT ITEM D | 2006.04.20 | 3GB | 15MB | ON | SECOND LEVEL |
| CONTENT ITEM C | 2006.04.10 | 3GB | 5MB | OFF | THIRD LEVEL |
| CONTENT ITEM B | 2006.03.20 | 3GB | 0MB | ON | THIRD LEVEL |
| CONTENT ITEM A | 2006.03.10 | 7GB | 0MB | OFF | SECOND LEVEL |

RECORDING APPARATUS, METHOD FOR CONTROLLING RECORDING APPARATUS, CONTROL PROGRAM OF RECORDING APPARATUS, AND COMPUTER-READABLE RECORDING MEDIUM

TECHNICAL FIELD

The present invention relates to a recording apparatus which is capable of recording digital broadcasts and the like and deletes information that has been already recorded to reserve free space.

BACKGROUND ART

As recording/reproducing apparatuses (recording/playback apparatuses, recording/playback devices) which record video signals of television broadcasts and the like, there have been conventionally proposed digital recording/reproducing apparatuses that handle broadcast signals as data streams in the form of digital signals and record the data streams as recording streams (recorded broadcast program) into a random access digital recording medium. Examples of the random access digital recording medium include hard disk HDD (Hard Disk Drive), digital multi-purpose disk DVD (Digital Versatile disk), and BD (Blu-ray Disc).

As the recording (the following description focuses on "image recording"), the recording/reproducing apparatuses including digital recording/reproducing apparatuses have the following functions. One is the so-called "timer recording" function of preselecting a recording time, starting recording at the preselected time, and stopping the recording at a designated time. Another is the so-called "normal recording" function of starting recording immediately in response to the entry of recording start instruction (execution of recording) and continuing recording until recording stop instruction is entered (execution of recording stop). In addition, some of the recording/reproducing apparatuses generally provide, as the recording functions, (i) the function of preselecting a recording finish time after the execution of recording and stopping the recording at the preselected time, and (ii) the function of setting timer recording to record at a designated time everyday or every week, and (iii) other similar functions.

Currently, general recording/reproducing apparatuses have, as standard functions, the function of obtaining information from G-Code®, EPG (Electronic Program Guide), or the like to preset a recording time, and the like functions.

Some of the digital recording/reproducing apparatuses include HDD as digital recording medium and have the function of deleting recording streams whose storage period has expired or recording streams that have been already viewed, taking advantage of random access properties of the HDD. This is the function for freeing up an occupied storage space as a free space into which new data streams can be recorded. As digital recording/reproducing apparatuses having such a function, there have been an apparatus which automatically determines level of importance of data and automatically deletes data according to the result of the determination (for example, see Patent Document 1) and an apparatus which deletes unnecessary portions of a title, instead of automatically deleting data by title (for example, see Patent Document 2). Further, there has been an apparatus which has the function of displaying candidates for deletion and warning on the basis of information on the frequency of reproductions when more free space of HDD is required to prompt the user to select any of the candidates, and freeing up a recordable space in accordance with the user's selection (for example, see Patent Document 3). Still further, there has been proposed an apparatus which displays date and time of a final program until which recording can be performed in a case where the apparatus is preset to record regularly broadcasted programs such as serial drama (for example, see Patent Document 4).

As listed above, there exist some recording/reproducing apparatuses which include a large-capacity HDD, but prompt the deletion for reserving storage space when more space is required in the HDD.

[Patent Document 1]
Japanese Unexamined Patent Publication No. 2003-217264 (published on Jul. 31, 2003)

[Patent Document 2]
Japanese Unexamined Patent Publication No. 2004-303368 (published on Oct. 28, 2004)

[Patent Document 3]
Japanese Unexamined Patent Publication No. 2002-268923 (published on Sep. 20, 2002)

[Patent Document 4]
Japanese Unexamined Patent Publication No. 2002-33983 (published on Jan. 31, 2002)

[Patent Document 5]
Japanese Unexamined Patent Publication No. 2001-160264 (published on Jun. 12, 2001)

DISCLOSURE OF INVENTION

However, the conventional recording/reproducing apparatuses which perform automatic deletion can perform deletion only in the order of predetermined priorities, or according to the remaining amount of data for each genre, or at predetermined deletion intervals.

In addition, under any conditions, there surely occurs the possibility that a program is deleted despite the user's intention. In this case, it is difficult for the user to grasp which recorded information has been deleted.

On the other hand, in the case of selected deletion, the user can select an object to be deleted. This avoids the occurrence of unintended deletion. However, in this case, due to a high-capacity HDD, many candidates for deletion are displayed for the selection of the object to be deleted. Consequently, it takes time and trouble for the user to select the object to be deleted to reserve space required for recording.

Particularly, with the use of the function of presetting to record at a predetermined time every week (every-week recording) for continual recording for a given period, the following problem arises. That is, even when sufficient space is left in a recording medium at the display of the candidates for deletion (e.g. at the time of presetting timer recording), the circumstance where more space is required may occur during the every-week recording over a long term. Without any recognition of this, intentional recording cannot be performed.

Similarly, in the case of normal recording, not timer recording, when the user stops recording is uncertain at the start of the recording. Accordingly, it is uncertain when space becomes insufficient. This prevents intentional recording from being performed.

The present invention has been attained in view of the above problems, and an object of the present invention is to realize a recording apparatus, a method for controlling a recording apparatus, a control program of a recording apparatus, and computer-readable recording medium all of which are capable of reserving required space in a recording medium with the user's appropriate operation.

A recording apparatus according to the present invention calculating a storage space required for recording a new content item and deleting a content item having been recorded in a recording medium so as to record the new content item in a case where a storage space of the recording medium is insufficient, said recording apparatus comprising: a storage section for storing (i) a content attribute database in which the content item having been recorded in the recording medium and attribute information sets of plural attribute items of the content item are associated with each other and (ii) a point database in which plural deletion factors having been set for each attribute item and deletion factor points are associated with each other; and point calculating means for extracting attribute information sets for each content item from the content attribute database and extracting deletion factor points associated with deletion factors corresponding to the extracted attribute information sets from the point database so as to calculate evaluation points in accordance with the extracted deletion factor points.

Further, a method according to the present invention for controlling a recording apparatus, calculating a storage space required for recording a new content item and deleting a content item having been recorded in a recording medium so as to record the new content item in a case where a storage space of the recording medium is insufficient, said recording apparatus including a storage section for storing (i) a content attribute database in which the content item having been recorded in the recording medium and attribute information sets of plural attribute items of the content item are associated with each other and (ii) a point database in which plural deletion factors having been set for each attribute item and deletion factor points are associated with each other, said method comprising a point calculation step in which attribute information sets for each content item are extracted from the content attribute database and deletion factor points associated with deletion factors corresponding to the extracted attribute information sets are extracted from the point database so as to calculate evaluation points in accordance with the extracted deletion factor points.

According to the above arrangement and the above method, in the content attribute information database, a content item having been recorded in the recording medium and attribute information sets of plural attribute items of the content item are associated with each other. The attribute items are items on content item. Examples of the attribute items include, but are not limited to, content name, date and time of recording, genre of content, and level of importance of content. The attribute information is information on the attribute item. Examples of the attribute information include, but are not limited to, information on content name (e.g. name (title) of a broadcast program), information on date and time of recording (i.e. 0:00 on Apr. 20, 2005 etc.), information on duration of recording (i.e. 30 minutes, etc.), genre of content (e.g. drama, news, sports, etc.), and level of importance of content (e.g. first rank, etc.).

In the point database, plural deletion factors having been set for each attribute item and deletion factor points are associated with each other. The deletion factors are factors used for deletion of a content item. For example, if the attribute information is duration of recording, the deletion factors are below 30 minutes duration of recording, 30 to below 60 minutes duration of recording, more than 60 minutes duration of recording. In another example, if the attribute information is time and date of recording, the deletion factors are time and date before Apr. 21, 2005 and time and date after Apr. 22, 2005. In still another example, if the attribute information is level of importance of content, the deletion factors are first rank and second rank. These are merely examples. Thus, the deletion factors correspond to the attribute information.

The deletion factor point is a point assigned in advance for each of the deletion factors. The deletion factor point may be assigned or changed by the user.

According to the above arrangement and the above method, it is possible to calculate evaluation points for each of the content items on the basis of the above-mentioned attribute information database and point database in the following manner. That is, attribute information sets are retrieved for each content item from the content attribute database, and deletion factor points associated with deletion factors corresponding to the retrieved attribute information sets are retrieved from the point database, so that evaluation points can be calculated in accordance with the retrieved plural deletion factor points.

Thus, evaluation points are calculated for each of the content items on the basis of deletion factor points which are points of factors corresponding to content attribute information sets and being used for deletion of a content item. Therefore, it is possible to set priorities for deleting content items on the basis of the evaluation points.

In this case, the user can check the evaluation points in the situation where the evaluation points are displayed. When the user gives instruction to delete a content item on the basis of the evaluation points, it is possible to reserve required space in a recording medium with an appropriate operation. Further, checking the evaluation points reduces trouble in selecting a content item to be deleted so as to reserve required space.

Alternatively, if the deletion factor points are arranged to be assigned or changed by the user even when a content item is arranged to be automatically deleted on the basis of the evaluation points, it is possible to perform deletion according to user's preference.

Note that a content item refers to any information such as video, audio, or texts, or collective information including some of these information sets. For example, assuming that a broadcast program is recorded, the content item is the broadcast program. As a matter of course, the content item may be the one under a category other than the category of the broadcast program. A new content item is assumed to include not only a content item recorded from the present time but also a content item that will be recorded in the future by presetting. A content item recorded in a recording medium is assumed to include not only a content item recorded in the recording medium at the present time, but also a content item of which recording in the recording medium is preset before the new content is recorded in the future.

Additional objects, features, and strengths of the present invention will be made clear by the description below. Further, the advantages of the present invention will be evident from the following explanation in reference to the drawings.

BRIEF DESCRIPTION OF DRAWINGS

FIG. 3(a) is a view illustrating an example of a content attribute information database DB1 or a table of a list of candidates for deletion.

FIG. 3(b) is a view illustrating an example of a content attribute information database DB1 in which a reproduction flag is updated or a table of a list of candidates for deletion.

FIG. 6(a) is a view illustrating an example of a marked list of candidates for deletion.

FIG. 6(b) is a view illustrating an example of a color-coded list of candidates for deletion.

FIG. 13 is a view illustrating an example of a screen on which recordable date and time information is displayed.

FIG. 14 is a view illustrating an example of a point database.

FIG. 17(a) is a view illustrating an example of a list of candidates for deletion.

FIG. 17(b) is a view illustrating an example of an sorted and updated list of candidates for deletion.

FIG. 18 is a view illustrating an example of a point database.

FIG. 19(a) is a view illustrating an example of a sorted and updated list of candidates for deletion.

FIG. 19(b) is a view illustrating an example of a sorted and updated list of candidates for deletion.

FIG. 19(c) is a view illustrating an example of a sorted and updated list of candidates for deletion.

BEST MODE FOR CARRYING OUT THE INVENTION

Embodiment 1

The following will describe an embodiment of the present invention with reference to FIGS. 1 through 14. The descriptions in the present embodiment assume that a recording apparatus of the present invention is a recording/reproducing apparatus. However, a recording apparatus of the present invention may be a recording apparatus that is not provided with a reproducing section. In addition, in the present embodiment, the word "recording" is used, indicating recording of video. However, a recording apparatus of the present invention may be a recording apparatus which records audio information only or text information only, and may be any apparatus as long as it can record information.

(Configuration of the Apparatus)

Figure 1:
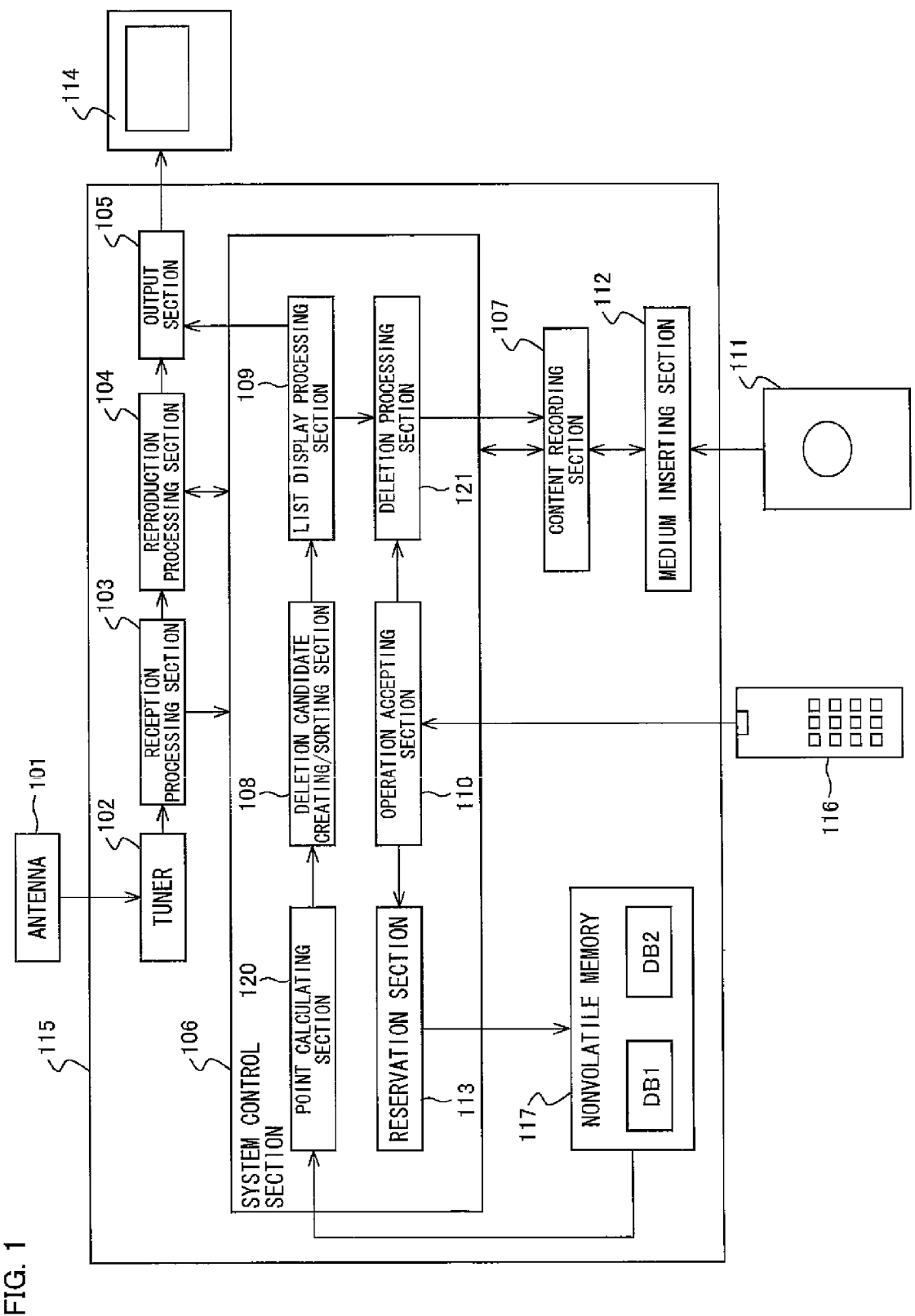
FIG. 1 is a block diagram illustrating an embodiment of the present invention and an essential configuration of a recording/reproducing apparatus.

FIG. 1 is a block diagram illustrating the configuration of a recording/reproducing apparatus (recording apparatus) 115 of the present embodiment. The recording/reproducing apparatus 115 calculates the amount of storage space required for recording of a new content item, deletes a content item recorded in a content recording section (recording medium) 107 if there is not sufficient storage space in the content recording section 107, and then records the new content item into the content recording section 107. Furthermore, the recording/reproducing apparatus 115 may be the one which calculates the amount of storage space required for recording a new content item, deletes a content item recorded in an external recording medium (recording medium) 111 if there is not sufficient storage space in the external recording medium 111, and then records the new content item into the external recording medium 111.

As illustrated in FIG. 1, the recording/reproducing apparatus 115 includes: a tuner 102; a reception processing section 103 which performs processing for the reception of a television broadcast to which a channel has been tuned in by the tuner 102; a reproduction processing section 104 which performs processing for the reproduction of a television broadcast; an output section 105 which outputs a television broadcast that has been subjected to reproduction processing to a display 114; a system control section 106; a content recording section (recording medium) 107 which records a content item; a medium inserting section 112 into which the external recording medium 111 is inserted; and a nonvolatile memory (storage section) 117. The content recording section 107 (recording medium) which records a content item is considered as a removable hard disk, and other removable media (e.g. optical disk typified by DVD, iVDR (Information Versatile Disk for Removable Usage) removable hard disk drive which is incorporated in the recording/reproducing apparatus (recording apparatus) 115). Further, the content recording section 107 may be a fixed hard disk device, which realizes a short access time and is less expensive. Still further, the content recording section 107 may be a recording medium which can be demounted from the recording/reproducing apparatus 115.

Further, the recording/reproducing apparatus 115 is controlled through a remote controller 116. Note that the recording/reproducing apparatus 115 may be controlled directly at the flick of switches, buttons, and the like provided on the recording/reproducing apparatus 115 as well as the remote controller 116.

The system control section 106 centralizes the control of the operations of various components in the recording/reproducing apparatus 115. The system control section 106 functions as a point calculating section (point calculating means) 120, a deletion candidate creating/sorting section (deletion priority setting means, content-to-be-deleted attribute information retention means) 108, a list display processing section (display processing means) 109, an operation accepting section 110, a deletion processing section (deletion processing means) 121.

On the basis of content attribute information database (content attribute database) DB1 and point database DB2, both of which will be described below, the point calculating section 120 is capable of calculating evaluation points for each content item in the following manner. That is, the point calculating section 120 retrieves attribute information sets for each content item from the content attribute information database DB1. Then, the point calculating section 120 retrieves from the point database DB2 deletion factor points associated with deletion factors corresponding to the retrieved attribute information sets, so that evaluation points can be calculated in accordance with the retrieved plural deletion factor points. Further, the point calculating section 120 weights the plural deletion factor points having been retrieved in accordance with weights having been set in attribute items of deletion factors corresponding to the deletion factor points, so as to calculate evaluation points in accordance with the plural deletion factor points having been weighted. The details of the calculation will be described later.

The deletion candidate creating/sorting section 108 sets priorities for deleting a content item recorded in the recording medium in accordance with the evaluation points calculated by the point calculating section 120. Further, the deletion candidate creating/sorting section 108 has the function of retaining content attribute information of a content item to be deleted into the nonvolatile memory 117 at the time of deleting the content item.

The list display processing section 109 displays attribute information sets of content items in the order of deletion priorities set by the deletion candidate creating/sorting section 108.

The operation accepting section 110 accepts all instructions given to the recording/reproducing apparatus 115 by the user.

The deletion processing section 121 deletes a content item recorded in the content recording section 107 in response to user's instructions accepted by the operation accepting section via the remote controller 116.

A timer-recording setting section 113 performs all the operations associated with timer recording requests accepted from the user.

Details of the operations performed by the point calculating section 120, the deletion candidate creating/sorting section 108, the list display processing section 109, the operation accepting section 110, the deletion processing section (deletion processing means) 121, and the timer-recording setting section 113 will be described later.

The nonvolatile memory 117 stores therein the content attribute information database DB1 and the point database DB2.

In the content attribute information database DB1, as illustrated in FIG. 3(*a*), a content item stored in the content recording section 107 is associated with sets of attribute information on a plurality of attribute items for the content item. The attribute items are items on content item. Examples of the attribute items include, but are not limited to, content name, date and time of recording, genre of content, and level of importance of content. The attribute information is information on the attribute item. Examples of the attribute information include, but are not limited to, information on content name (e.g. name (title) of a broadcast program), information on date and time of recording (i.e. 0:00 on Apr. 20, 2005 etc.), information on duration of recording (i.e. 30 minutes, etc.), genre of content (e.g. drama, news, sports, etc.), and level of importance of content (e.g. first rank, etc.).

In the point database DB2, as illustrated in FIG. 14, a plurality of deletion factors set for each of the attribute items are associated with deletion factor points. The deletion factors are factors used for deletion of a content item. For example, if the attribute information is duration of recording, the deletion factors are below 30 minutes duration of recording, 30 to below 60 minutes duration of recording, 60 minutes or more duration of recording. In another example, if the attribute information is time and date of recording, the deletion factors are time and date before Apr. 21, 2005 and time and date after Apr. 22, 2005. In still another example, if the attribute information is level of importance of content, the deletion factors are first rank and second rank. These are merely examples. Thus, the deletion factors correspond to the attribute information.

The factor point is a point assigned in advance for each of the deletion factors. The factor point may be assigned or changed by the user.

In the recording/reproducing apparatus 115, a digital television broadcast received by an antenna 101 is captured into the recording/reproducing apparatus 115 and displayed in the form of recorded data or displayed in real time. In the present embodiment, the following descriptions take a digital television broadcast. However, the television broadcast is not limited to a digital television broadcast. After being tuned in to by the tuner 102, the digital television broadcast is processed by the reception processing section 103. In order to display the digital television broadcast, digital broadcast signals are transmitted to the reproduction processing section 104 so as to be subjected to reproduction process, and then displayed on the display 114 through the output section 105.

In order to record a content item in the recording/reproducing apparatus 115, the reception processing section 103 transmits digital television broadcast signals to the system control section 106. Then, under the control of the system control section 106, the content recording section 107 receives the digital television broadcast signals to record the corresponding content item therein.

In order to perform the so-called timer recording, in which a time for recording is preselected, the system control section 116 accepts user's operation via the remote controller 116 or others, and the timer-recording setting section 113 stores timer recording information in the nonvolatile memory 117. Then, the system control section 106 controls the content recording section 107 so that the content recording section 107 starts recording with reference to the timer recording information at the preselected time.

The deletion candidate creating/sorting section 108 retrieves candidates for deletion on the basis of various kinds of information such as a remaining time in the content recording section 107, and sorts and creates a list of candidates for deletion, before the digital television broadcast signals are recorded in the content recording section 107 or at other timings. How to create/sort the list of candidates for deletion, which is not particularly limited, will be described with a specific example later.

The thus created list of candidates for deletion is transmitted to the list display processing section 109 and displayed on the display 114 via the output section 105. In a case where a content item is recorded while being outputted to the display 114, digital television broadcast signals are supplied to both the display 114 and the content recording section 107.

In reproducing a content item recorded in the content recording section 107, the system control section 106 drives the content recording section 107 according to the user's operation so that reproduction signals are read from the content recording section 107. Then, the content item is displayed on the display 114 via the reproduction processing section 104 and the output section 105. Further, the content item recorded in the content recording section 107 is deleted by the deletion processing section 121.

The following will describe a method of displaying candidates for deletion at the start of recording and at the timer recording to prompt deletion in the recording/reproducing apparatus 115 arranged as above.

(Creation and Updating of Deletion Candidate List)

Figure 2A:
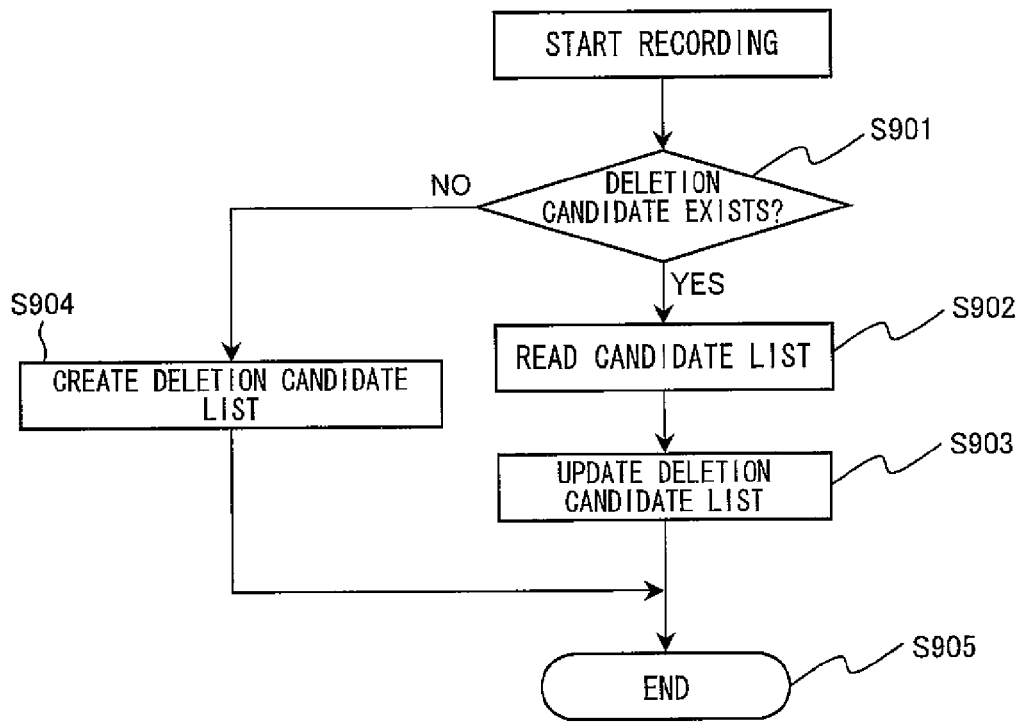
FIG. 2(a) is a flowchart of creating a list of candidates for deletion at the start of recording.
Figure 2B:
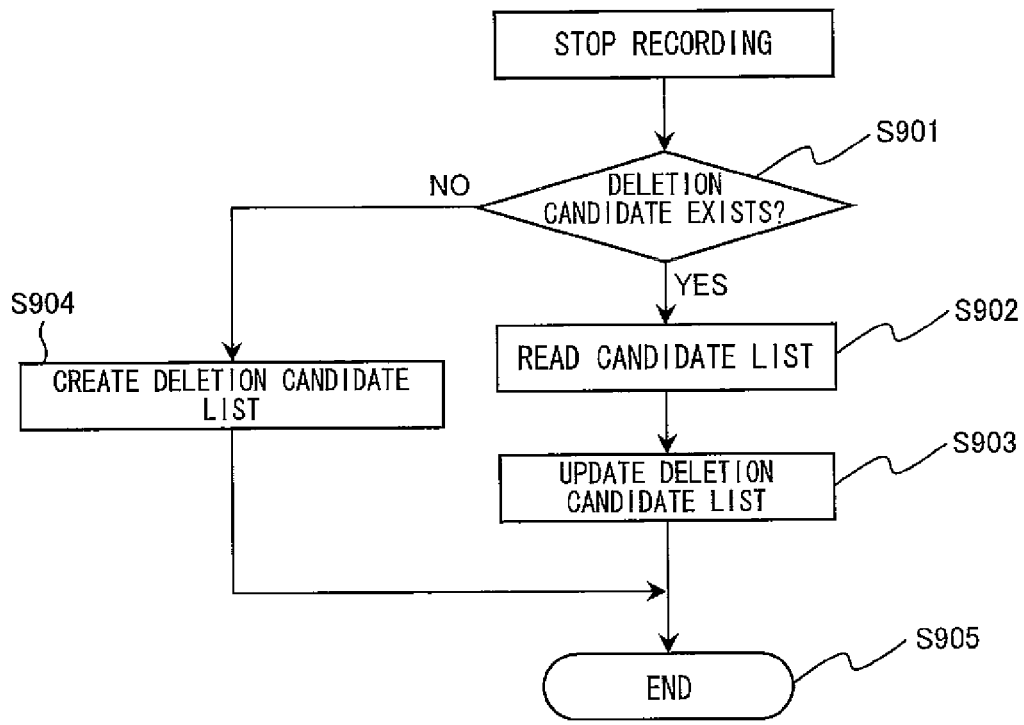
FIG. 2(b) is a flowchart of creating a list of candidates for deletion at the stop of recording.

The following will describe creation and updating of the deletion candidate list by the recording/reproducing apparatus 115. In the present embodiment, the deletion candidate list is created simultaneously with the recording of a digital television broadcast or the like into the content recording section 107. If the deletion candidate list is created at the start of recording, the list is created in the procedure represented by a flowchart illustrated in FIG. 2(a), for example. As illustrated in FIG. 2(a), it is determined in advance whether the deletion candidate list has already existed (S901). If recording is to be performed (No in S901), the deletion candidate list is created by registering information on a content item of which recording has been started into the list of candidates for deletion (S904). If the deletion candidate list has already existed (YES in S901), the list is read (S902) and the list is updated (S903). As illustrated in FIG. 2(b), the list creation may be performed at the stop of recording, not at the start of recording, or during the recording. The procedure for creating the deletion candidate list at the stop of recording in FIG. 2(b) is the same as the procedure illustrated in FIG. 2(a). Therefore, the same steps are given the same reference numerals, and explanation thereof is omitted.

All the content items recorded are not necessarily registered in the deletion candidate list. For example, the deletion candidate list is updated to register only the content item that has been already reproduced. Thus, only the content item that meets a predetermined criterion may be registered in the deletion candidate list in such a manner, for example, that a content item of which dubbing on the external recording medium 111 is preset is excluded from the deletion candidate list, and the deletion candidate list is updated to register only the other content items.

The deletion candidate list is stored in the form of a table as illustrated in FIG. 3(a), and used as data for information display at the actual deletion, which will be described later. In the present embodiment, the deletion candidate list is constituted by the following four items: content name, time and date of recording, duration of recording, and reproduction flag. At the timing right after the recording, the reproduction flag is always OFF. The items are not limited to these four items. The number of items can be increased or decreased depending upon sorting criteria for the deletion candidate list and others. The creation of the deletion candidate list may be performed when data is recorded into the content recording section 107 for the first time.

However, the updating of the deletion candidate list may be performed at any timing, which is not limited to the start of recording and during display, as long as it is a timing when information recorded in the content recording section 107 is updated as in the cases given below or the like cases.

Examples of the timing of updating the deletion candidate list include:

(1) In a case where the number of content items has increased at the time of recording or the like time;

(2) In a case where the number of content items has decreased at the time of deletion or the like time;

(3) In a case where content has been subjected to any operation such as reproduction;

(4) In a case where content has been subjected to any change such as editing;

(5) In a case where increase or decrease has occurred in the number of times of reference from a play list or others;

(6) In a case where a content item has been transferred to other medium by dubbing or the like operation; and (7) Other cases including a case where instructions from the user or the system have been received.

For example, in a case where content item B has been played back in FIG. 3(a), the corresponding reproduction flag is updated to ON as illustrated in FIG. 3(b). Accordingly, the list having been sorted in a sorting manner, which will be described below, is further updated.

The descriptions in the present embodiment assume that the deletion candidate list is created at the start of content recording or at the stop (end) of recording. However, the creation timing is not particularly limited to this timing. Alternatively, the deletion candidate list may be created for the first time in displaying the deletion candidate list actually.

Next, sorting of the deletion candidate list will be described.

Figure 4:
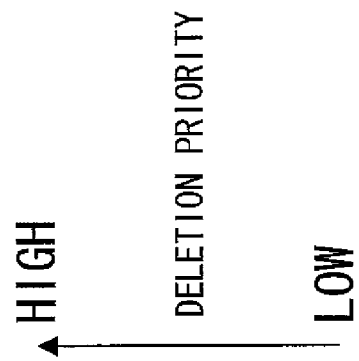
FIG. 4 is a view illustrating an example of a sorted and updated list of candidates for deletion.

Sorting may be performed in any manner. For example, if higher priorities for deletion are given to content items having been recorded at older dates and times, the deletion candidate list remains as in FIG. 3(b) of the present embodiment. However, for example, if sorting is performed in such a manner that higher priorities for deletion are given to content items having been already reproduced, sorting is performed as illustrated in FIG. 4 and the list is updated.

Criteria adopted for sorting are not limited to the above and may be any information. Specifically, sorting may be performed according to the following criteria:

(1) sorting candidates so that older items are more preferentially displayed according to information on date and time of recording;

(2) sorting in ascending or descending order according to information on the number of reproductions (viewings);

(3) sorting with a higher priority given to a dubbed content item, according to information on dubbed content items;

(4) sorting with a lower priority given to serial programs, according to information on serial programs;

(5) sorting by flag in a case where there are flags arbitrarily assigned by the user or the system;

(6) sorting by genre of program; and (7) sorting by a combination of the criteria (1) through (6) (e.g. evaluation function values weighted by parameters)

As a matter of course, in order to adopt these criteria, it is necessary to record another necessary information in the readable manner as items of the list or as information handled in creating the list.

The above descriptions with reference to FIG. 4 take simple sorting criteria as an example, for ease of explanation. However, in a recording/reproducing apparatus of the present invention, an actual list is sorted under a combination of the two or more sorting criteria, and then updated.

The following will describe the sorting manner such that a higher priority for deletion is given to a content item having been already reproduced and the sorting manner such that sorting criteria also includes duration of recording as illustrated in FIG. 4, in which an example of sorting is shown.

In a case where there exists the deletion candidate list which has been sorted as illustrated in FIG. 4, the content items are listed in the order of higher priorities for deletion as follows.

Content item B 2005 Apr. 19 30 minutes ON
Content item A 2005 Apr. 9 30 minutes OFF
Content item C 2005 Apr. 21 30 minutes OFF
Content item D 2005 Apr. 22 60 minutes OFF
Content item E 2005 Apr. 22 60 minutes OFF On the other hand, the followings are examples of sorting performed in such a manner that relatively high priorities are given considering not only the above sorting criteria and duration of recording. In these examples, the content items are listed in the order of higher priorities.

EXAMPLE 1

Content item B 2005 Apr. 19 30 minutes ON
Content item A 2005 Apr. 9 30 minutes OFF
Content item D 2005 Apr. 22 60 minutes OFF
Content item E 2005 Apr. 22 60 minutes OFF
Content item C 2005 Apr. 21 30 minutes OFF

EXAMPLE 2

Content item B 2005 Apr. 19 30 minutes ON
Content item D 2005 Apr. 22 60 minutes OFF
Content item E 2005 Apr. 22 60 minutes OFF
Content item A 2005 Apr. 9 30 minutes OFF
Content item C 2005 Apr. 21 30 minutes OFF

EXAMPLE 3

Content item B 2005 Apr. 19 30 minutes ON
Content item D 2005 Apr. 22 60 minutes OFF
Content item A 2005 Apr. 9 30 minutes OFF
Content item C 2005 Apr. 21 30 minutes OFF
Content item E 2005 Apr. 22 60 minutes OFF

EXAMPLE 4

Content item C 2005 Apr. 21 30 minutes OFF
Content item B 2005 Apr. 19 30 minutes ON
Content item A 2005 Apr. 9 30 minutes OFF
Content item D 2005 Apr. 22 60 minutes OFF
Content item E 2005 Apr. 22 60 minutes OFF In Example 1, it is judged that the content items D and E, whose duration of recording is longer, have higher priorities for deletion than the content item C. Furthermore, it is judged the content items D and E, which were recorded 13 days earlier than the content item A, have lower priorities for deletion than the content item A. As a result of this, the result of the sorting is as indicated in Example 1.

In Example 2, the sorting criteria is the same as that of Example 1, except that sorting is performed on whether the difference in date and time of recording exceeds 1 month. Since difference (13 days) in time and date of recording between the contents items D and E and the content item A is smaller than a preset value (1 month), the sorting result in Example 2 is different from the sorting result in Example 1. That is, the content items D and E have higher priorities for the deletion.

In Example 3, sorting is performed with a high weight assigned to duration of recording, unlike Example 1 with weights assigned to a plurality of sorting criteria. In Example 3, assuming that a space to be reserved by deletion in the recording apparatus corresponds to a recording time of 90 minutes, it was found possible to reserve the space by deleting the contents B and D. The content item D is not in the same level of priority as the content item E although the content items D and E were recorded at the same time and date and for the same duration in the original sorting criteria illustrated in FIG. 4. As a matter of course, sorting is performed with a higher priority for deletion given to the content item E if the space to be freed up is more than 120 minutes.

In Example 4, sorting criteria different from that in Example 3 is adopted. For example, the highest priority is given to the content item C if the content item C is an unimportant content item, serial program, or genre for the user. Further, if the highest weight is assigned to the reproduction flag out of the sorting criteria, the content item C and the content item B change their places.

Here, the recording/reproducing apparatus 115 performs the following processes for setting priorities for deleting content items.

An example of evaluation function values weighted under the sorting criteria will be described with reference to the example of sorting in Example 4.

Assume that in a case where sorting criteria (attribute items) are the following four elements: reproduction flag, duration of recording, a time period elapsed from a recording date and time, and level of importance of content item, evaluation function is defined as follows:

$$\text{Evaluation function: } W1 \times V1 + W2 \times V2 + W3 \times V3 + W4 \times V4$$

where $W1$, $W2$, $W3$, and $W4$ are weighting factors under the respective sorting criteria, and $V1$, $V2$, $V3$, and $V4$ are evaluation values under a single sorting criterion. Assuming that $W1$, $W2$, $W3$, $W4$ are assigned weights of 20, 10, 20, and 100, respectively, the evaluation function is represented as follows:

$$\text{Evaluation function: } 20 \times V1 + 10 \times V2 + 20 \times V3 + 100 \times V4$$

According to the following (1) through (4), evaluation values (deletion factor points) in each of the sorting criteria are assigned. These evaluation values are collectively shown in FIG. 14.

(1) If the reproduction flag (V1) is ON, 30 (points) is assigned, and if OFF, 0 (point) is assigned.

(2) If duration of recording (V2) is below 30 minutes, 5 (points) is assigned, if 30 to below 60 minutes, 10 (points) is assigned, and if more than 60 minutes, 20 (points) is assigned.

(3) If a time period having elapsed from a recording date and time (V3) is on or before Apr. 20, 2005, 50 (points) is assigned, and if on or after Apr. 21, 2005, 0 (point) is assigned.

(4) If level of importance of content item (V4) is first rank, 5 (points) is assigned, and if second rank and third rank, 10 (points) and 30 (points) are assigned, respectively.

Note that level of importance of content item may be decided by the user or may be decided according to the criteria predetermined by the recording/reproducing apparatus 115.

Assume that content items A, B, E are in high level of importance (first rank), content item D is in relatively low level of importance (second rank), and content item C is in the lowest level of importance (third rank). In this case, evaluation function values (evaluation points) of the content items A, B, C, D, E are calculated according to the information (attribute information) for each of the content items in Example 4 above. The result of the calculation is given below. The calculation is performed with reference to the content attribute information database DB1 and the point database DB2, both of which are stored in the nonvolatile memory 117.

Content item A: 20×0+10×5+20×50+100×5=1550 (points)

Content item B: 20×30+10×5+30×50+100×5=2150 (points)

Content item C: 20×0+10×5+30×0+100×30=3050 (points)

Content item D: 20×0+10×10+30×0+100×10=1100 (points)

Content item E: 20×0+10×10+30×0+100×5=600 (points)

The result of sorting in which higher priorities for deletion are given to content items having higher points of evaluation function values is therefore as in Example 4 above.

If the weight (W1) with respect to the reproduction flag is changed to the highest weight, for example, if W1 is changed from 20 to 150, evaluation function values of the content items A, B, C, D, E are as follows.

Content item A: 150×0+10×5+20×50+100×5=1550 (points)

Content item B: 150×30+10×5+30×50+100×5=6050 (points)

Content item C: 150×0+10×5+30×0+100×30=3050 (points)

Content item D: 150×0+10×10+30×0+100×10=1100 (points)

Content item E: 150×0+10×10+30×0+10×5=600 (points)

In this manner, the evaluation function values vary. That is, the content item B has the highest value, and the content item C and the content item B change their places in the priority.

In the above examples, the evaluation function values have been calculated on the basis of the four criteria: reproduction flag, duration of recording, a time period having elapsed from a recording date and time, and level of importance of content item. However, this is not only the possibility. Alternatively, another evaluation function in which criteria and the number of criteria are appropriately set may be adopted if it is based on information regarding the content items.

Although weights are assigned to the sorting criteria in the above examples, the weights are not necessarily assigned. That is, W1, W2, W3, W4 above may be all 1.

Further, in the above examples, the evaluation function is realized by a linear function sum of the evaluation values of the respective sorting criteria. However, this is not only the possibility. For example, the evaluation function may be realized by a high-dimensional function, or may be realized by multiplication of evaluation values of the respective sorting criteria.

Still further, the updating may be performed at any timing(s), for example, at the start of reproducing the content item B, after the completion of reproduction, and/or at the list display, and the timings of the updating may be combined in any way.

Next, the following will describe a method for actually displaying the thus created deletion candidate list.

Figures 5A, 5B:
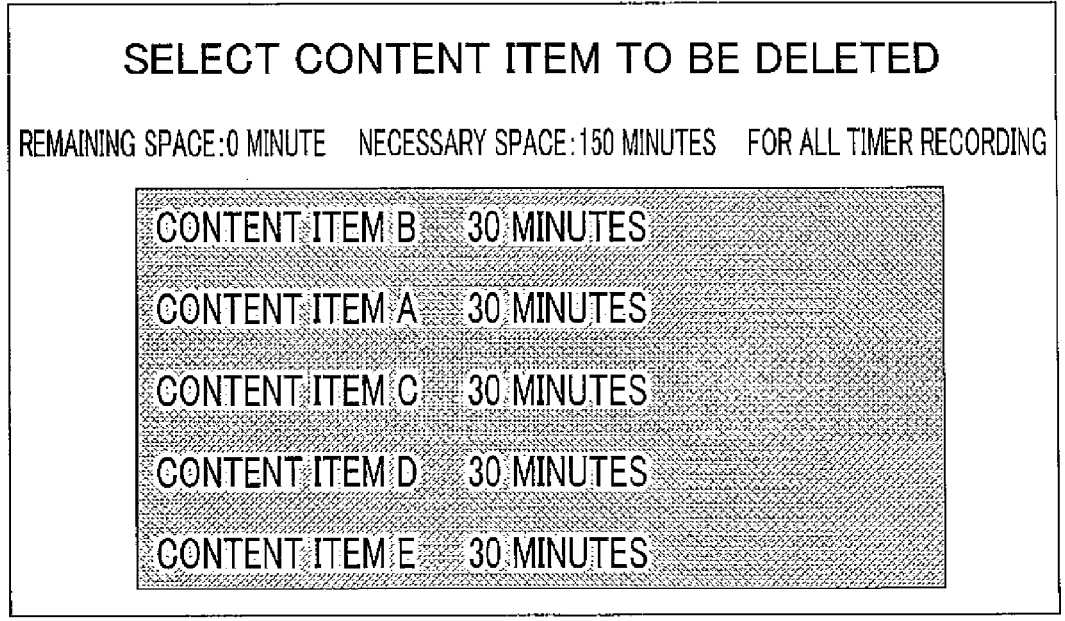
FIG. 5(a) is a view illustrating an example of a list of accepted requests for timer recording.
FIG. 5(b) is a view illustrating an example of a list of candidates for deletion when the requests for timer recording in FIG. 5(a) are accepted.

The recording/reproducing apparatus 115 does not simply display a sorted deletion candidate list, but presents, in user-selectable form, content items to be deleted in order to free up space corresponding to the amount of required space estimated from the timer recording information or the like. For example, assume that the recording is preset in a manner as illustrated in FIG. 5(a) and the remaining space is 0. In this case, a screen display is produced as illustrated in FIG. 5(b).

In FIG. 5(b), possible content items to be deleted to reserve space required for all the timer recordings are displayed. In this example, the number of content items recorded matches the number of possible content items to be deleted. Actually, a display screen is produced in user-distinguishable manner. For example, only attribute information of possible content items to be deleted is displayed among enormous number of content items recorded in a content recording section 197. Alternatively, only sets of attribute information of candidates that need to be deleted to reserve space among all the possible content items to be deleted are displayed with the sets of attribute information color-coded or marked. These examples are shown in FIGS. 6(a) and 6(b). FIG. 6(a) shows marking with asterisks (* in FIG. 6(a)). FIG. (6b) shows color-coding. In the examples of display of candidates for deletion, all the candidates for deletion cannot be displayed on one screen. Therefore, all the sets of attribute information of the content items displayed on the display screen are marked or color-coded. As a matter of course, if subsequent pages can be displayed on the screen or if a small number of candidates for deletion exist, sets of attribute information of content items recorded and the number of possible content items to be deleted are both displayed on one screen.

Figure 7A:
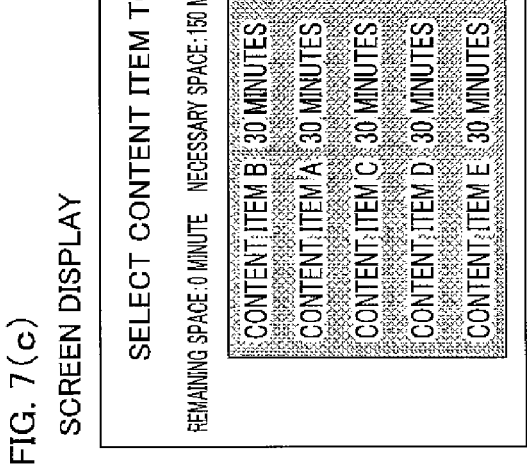
FIG. 7(a) is a view illustrating an example of a list of candidates for deletion in which a candidate for deletion in a one-day period is presented.
Figure 7C:
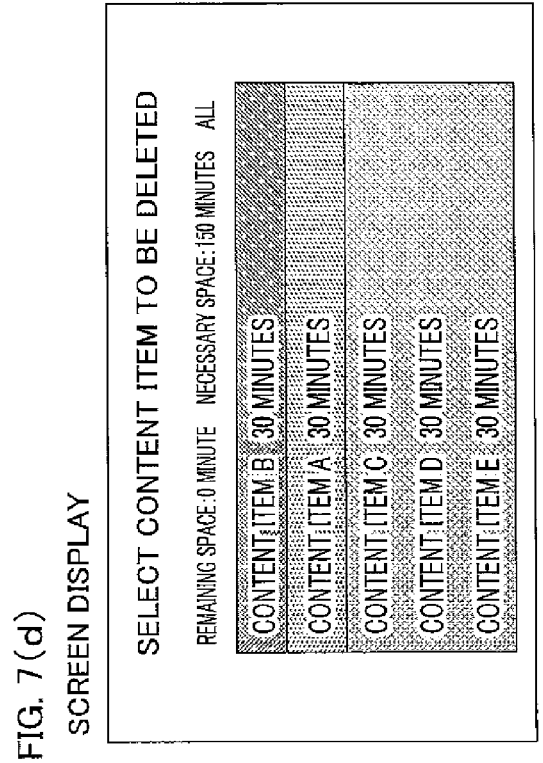
FIG. 7(c) is a view illustrating an example of a list of candidates for deletion in which candidates for deletion in a one-month period are presented.
Figure 7B:
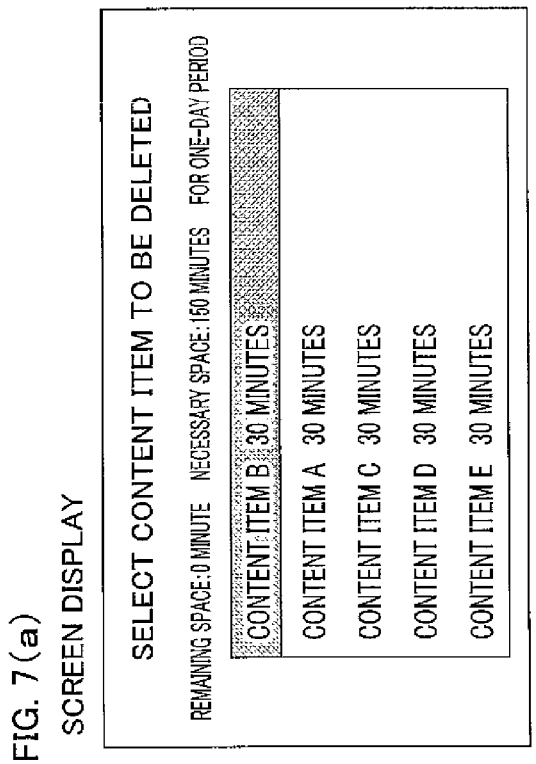
FIG. 7(b) is a view illustrating an example of a list of candidates for deletion in which a candidate for deletion in a one-week period is presented.
Figure 7D:
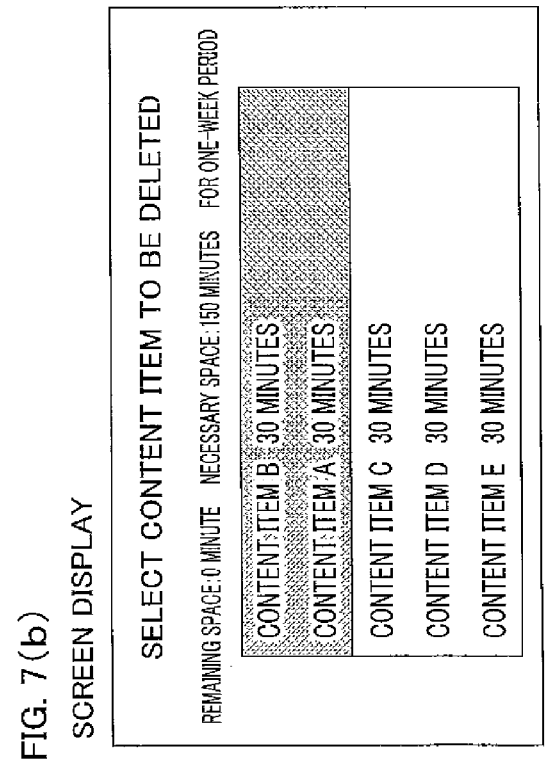
FIG. 7(d) is a view illustrating an example of a list of candidates for deletion in which candidates for deletion in three particular periods are presented at the same time.

All the possible candidates for deletion to free up space required for timer recording are not necessarily displayed. Instead, the possible candidates for deletion may be displayed as illustrated in FIGS. 7(a) through 7(d), for example. That is, spaces required for timer recording in particular periods, e.g. one-day period or one-week period are displayed separately or at the same time. In FIG. 7(a), a candidate for deletion in one-day period are presented. In FIG. 7(b), candidates for deletion in one-week period are presented. In FIG. 7(c), candidates for deletion in one-month period are presented. In FIG. 7(d), candidates for deletion in these three particular periods are displayed at the same time. Note that in FIG. 7(a) and FIG. 7(b), the number of content items recorded and the number of possible content items to be deleted are simultaneously displayed on one screen.

Such a display allows the user to obtain minimum information required for the deletion of content items.

Figures 8A, 8B:
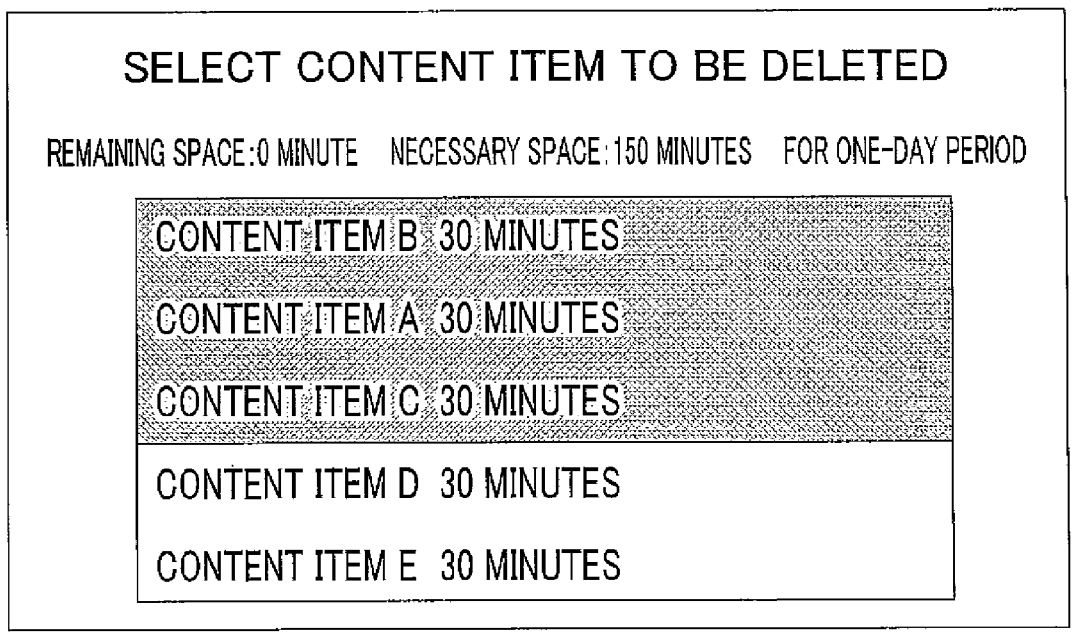
FIG. 8(a) is a view illustrating an example of a list of accepted requests for timer recording, but illustrating an example different from that in FIG. 5(a).
FIG. 8(b) is a view illustrating an example of a list of candidates for deletion when the requests for timer recording in FIG. 8(a) are accepted, but illustrating an example different from that in FIG. 5(b).

Similarly, it is possible to perform display for each of the particular periods in a case where the recording/reproducing apparatus 115 can be programmed to perform recordings for the same time period every week or everyday as illustrated in FIG. 8.

All the above examples assume that calculation and display are performed on the basis of (i) estimated required space calculated at the timer recording and (ii) the amount of space remaining in the recording medium. However, the list may be displayed during or before normal recording or at other timing. Specifically, the list may be displayed at the following timings (1) through (8):

(1) At the start of recording after the amount of available space for recording becomes smaller than a given space;

(2) When the amount of available space for recording becomes smaller than a given space during recording;

(3) All the times at the completion of recording or at the start of recording;

(4) (When more space is required) At timer recording;

(5) When more space is expected to need at the end of recording, judging from program information at the start of recording;

(6) When space calculated from the recording stop time set during recording;

(7) All the times at the power-on; and (8) Any timing determined by the user or the system Next, how to select a candidate for deletion displayed and how to delete at the selection will be described.

Selection of a candidate for deletion may be performed by any method. For example, with the push of a given key on the remoter controller when the candidates are displayed, a screen as illustrated in FIG. 9, i.e. a screen for asking whether the deletion will be made or not by default is brought up to prompt the deletion.

In this case, if the user wants to make change to another candidate for deletion, not a candidate for deletion presented first, the user selects "NO" or makes another choice. This brings up a screen for individual selection so that the user can change to the other candidate for deletion.

Figure 9:
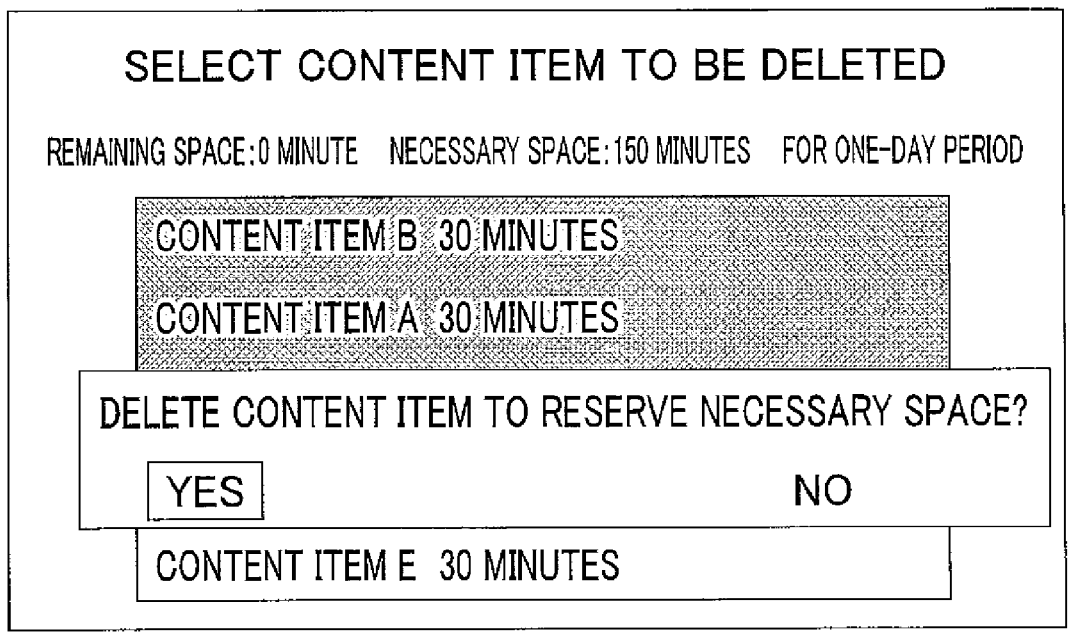
FIG. 9 is a view illustrating an example of the case where a content item to be deleted is selected in a list of candidates for deletion.

Depending upon the functions of the buttons on the remote controller, the confirmation screen as illustrated in FIG. 9 is not necessarily brought up with the push of a particular key when the candidates for deletion are displayed. Alternatively, a screen for changing or choosing a candidate for deletion may be brought up.

The recording/reproducing apparatus 115 deletes the candidate for deletion selected in the above-mentioned manner on the spot. The deletion is not necessarily made at the time of selection. Alternatively, the selected content item may be separately recorded as a content item to be deleted with high priority, and deleted when more space is required for recording after the start of recording. In other words, automatic deletion can be preset.

Figure 10:
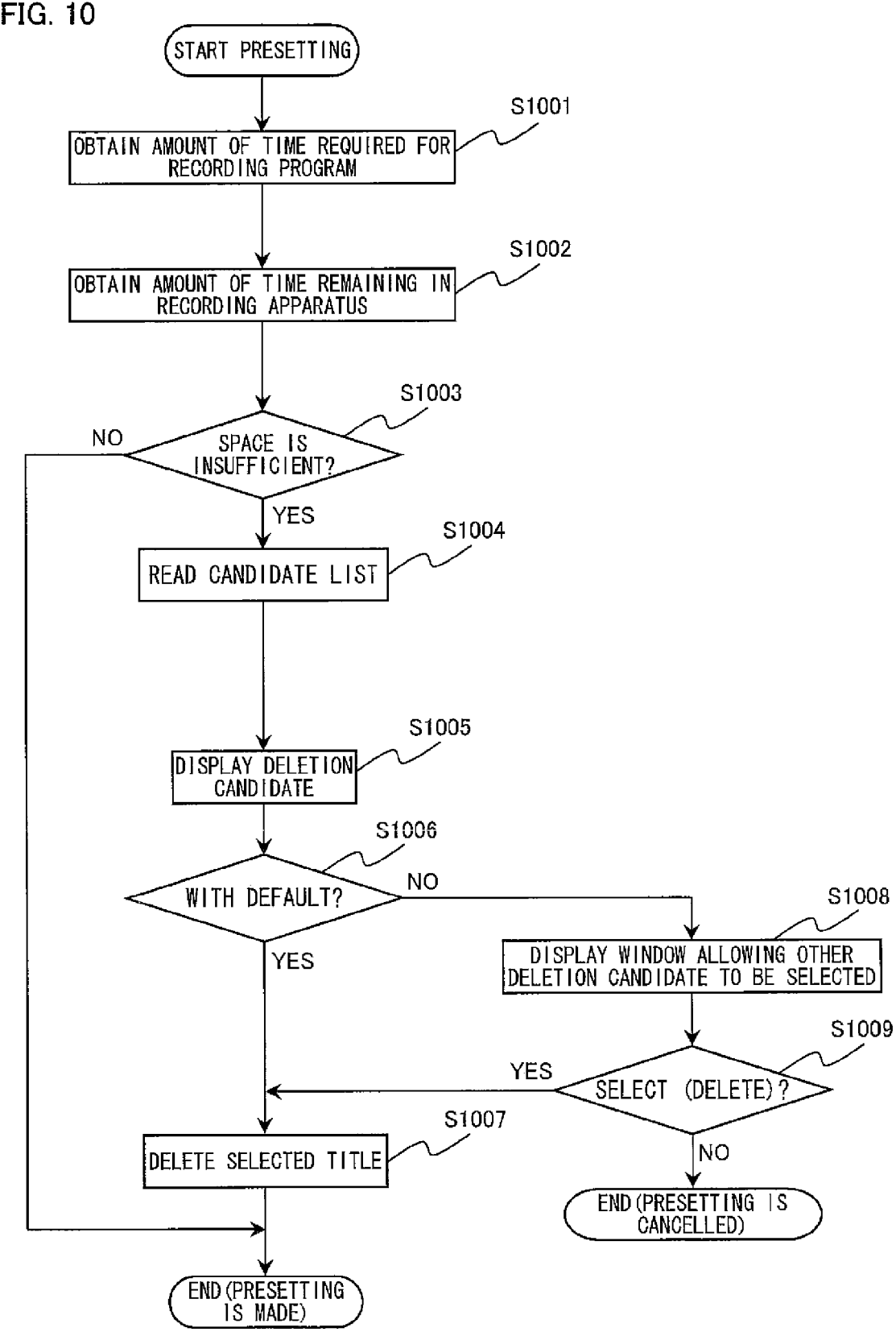
FIG. 10 is a flowchart of the process in which attribute information of a content item as a candidate for deletion is displayed when the recording/reproducing apparatus is preset for timer recording.
Figure 11:
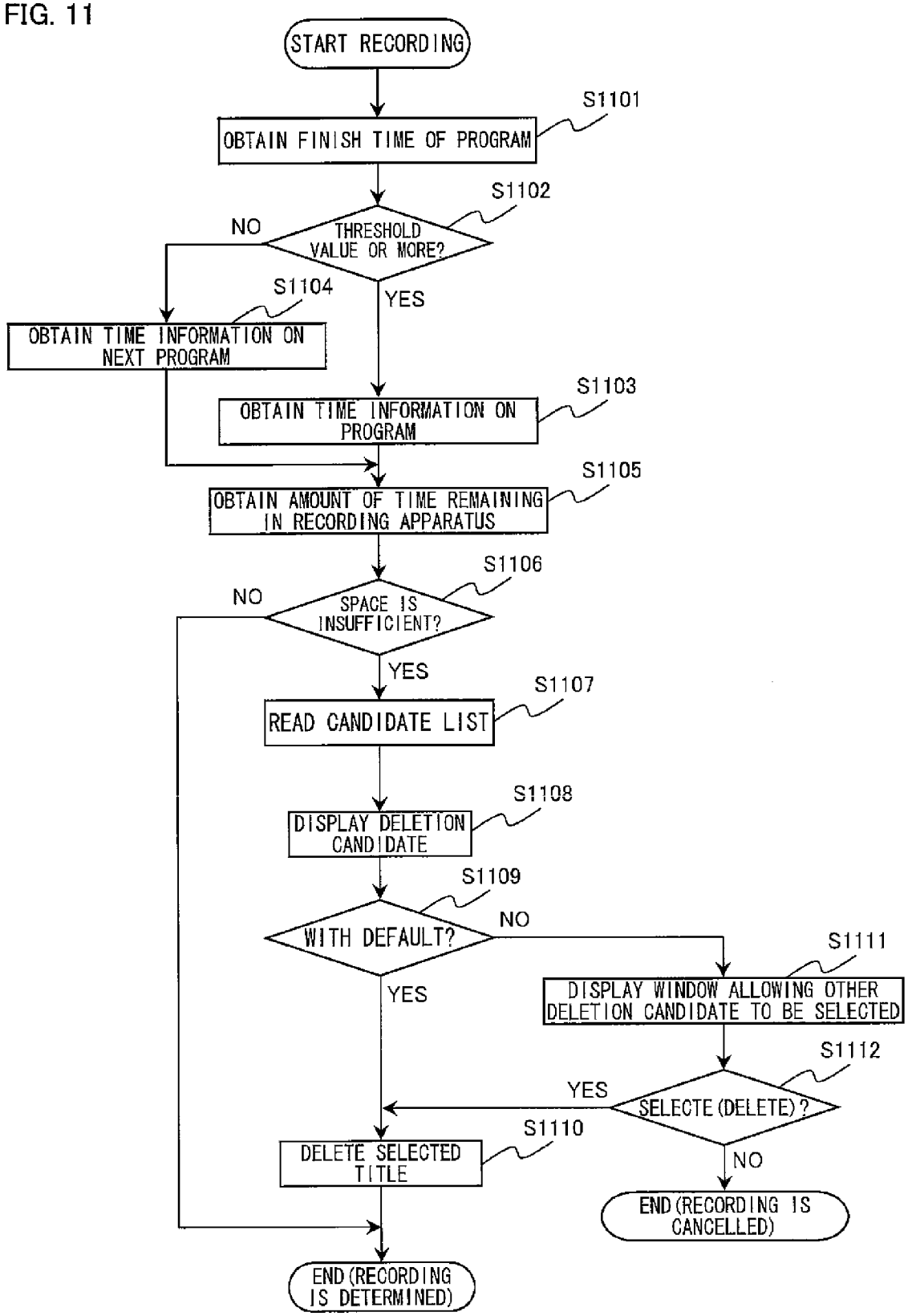
FIG. 11 is a flowchart of the process in which attribute information of a content item as a candidate for deletion is displayed when the recording/reproducing apparatus performs normal recording of a currently displayed program.

FIGS. 10 and 11 show typical flows of displaying and deleting a candidate for deletion by using the above-described method of creating the deletion candidate list, displaying, and selective deletion.

FIG. 10 shows an example of the case where candidates for deletion are displayed when the recording/reproducing apparatus 115 is preset to perform recording by using EPG (electronic program guide). First, as illustrated in FIG. 10, when a target program (content item) is selected after the start of timer recording setting, the amount of time required for recording is obtained from the EPG in S1001. When the amount of time required for recording is obtained, the process proceeds to S1002 to obtain the amount of space (time) remaining in the content recording section 107 for timer recording. In this case, the present embodiment assumes that the amount of remaining space is obtained and displayed on a time basis. However, the remaining space may be expressed in unit of byte or in any unit.

Next, in S1003, the amount of time required for recording is compared with the amount of remaining space (time) for the determination whether the amount of remaining space is sufficient or not. In this case, a threshold level may be set to be moment when the amount of remaining space falls below 0. Alternatively, the threshold level may be set to be the moment when an actual amount of remaining space falls below a predetermined amount of remaining space, e.g. 30 minutes. These setting can be determined by the user or the recording/reproducing apparatus 115 as appropriate. If sufficient space is reserved, the timer recording setting process is ended on the spot without the need to perform the process of selecting a candidate for deletion.

If more space is required, the process proceeds to S1004 to retrieve the deletion candidate list, and then the deletion candidate list is displayed in S1005. In this case, it is assumed that the deletion candidate list is retrieved and displayed at the recording. Alternatively, from information on content items recorded, the deletion candidate list may be created for the first time at the recording and then displayed.

After the display of the list, if there is the user's operation indicating that there is no problem with deletion of a candidate for deletion displayed by default with the use of the remote controller, the process proceeds to S1007. In S1007, the selected content item is deleted and the process is ended.

If there is the user's operation indicating that reselection is needed, the process proceeds to S1008. In S1008, other candidates are displayed, urging the user to select any of the candidates for deletion.

Thereafter, in S1009, the user selects any of the candidates for deletion. If the user wants to delete the selected candidate, the process proceeds to S1007. In S1007, the selected content item is deleted and the process is ended. If no selection is made by the user in S1009, the selection step is stopped and the timer recording setting process is cancelled.

Note that in a case where a candidate for deletion has not been selected, the process may be ended with only timer recording information registered.

Next, FIG. 11 shows an example of the case where candidates for deletion are displayed at the time of normally recording a currently displayed program.

First of all, in starting recording, a finish time of a program is obtained from the EPG in S1101. At this time, it is determined whether a time remaining before the finish time is more than a threshold value (e.g. 1 minute). If it is more than the threshold value, it is judged that the program is a target content item, and the process proceeds to S1103 to obtain time information and others on the program. If it is less than the threshold value, it is judged that the current program will be finished soon, and the process proceeds to S1104. In S1104, EPG of a subsequent program as a target program for recording is obtained. The operations in S1105 and the subsequent steps are the same as those for the timer recording, which has been described with reference to FIG. 10, and detailed explanation thereof is omitted.

Figure 12:
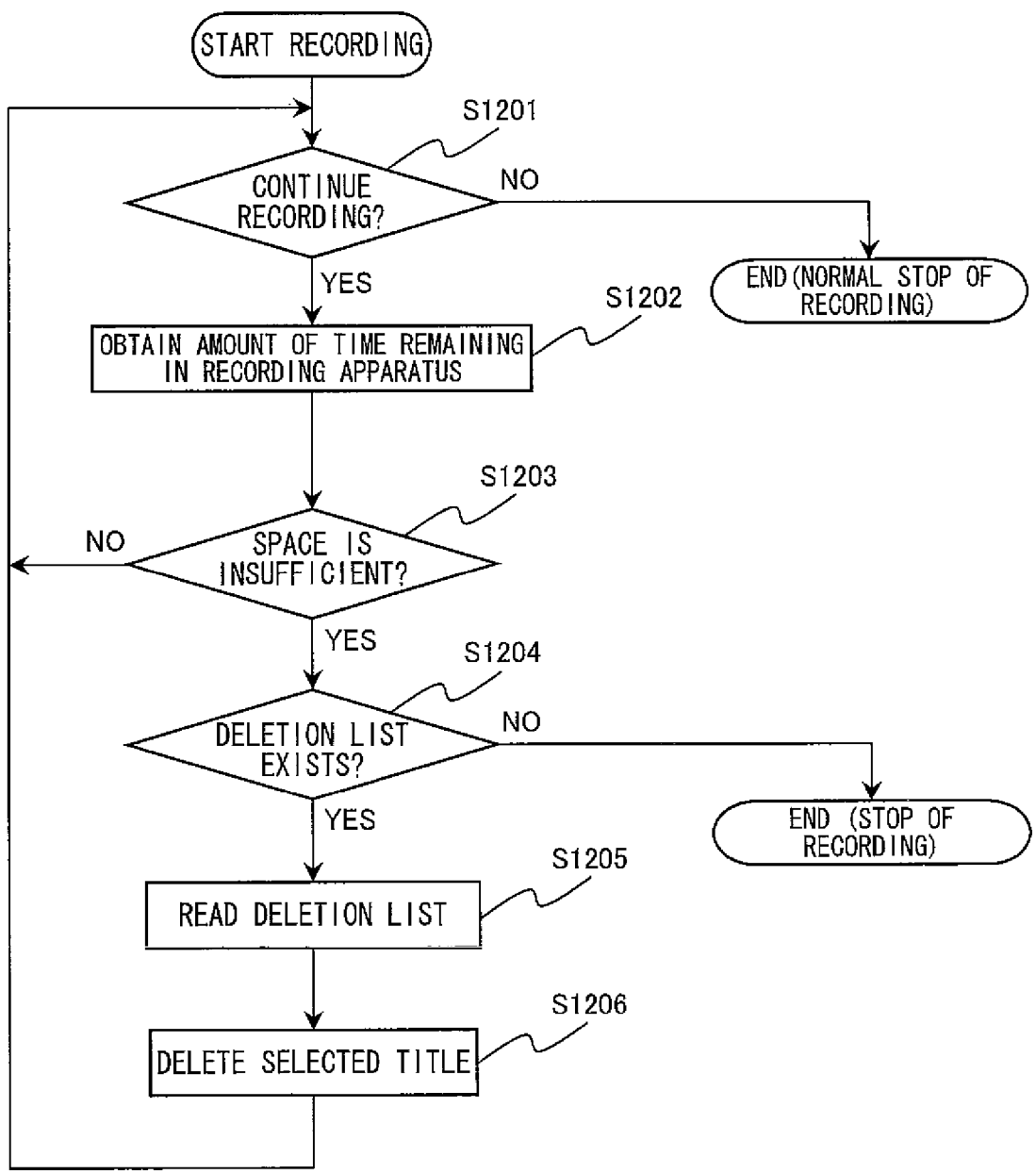
FIG. 12 is a flowchart of a deletion process in a case where registration is made in timer deletion in the recording/reproducing apparatus.

FIG. 12 shows an example of a deletion flow of a case where registration is made for timer deletion, instead of deleting in S1007 and S1110 during the setting for timer recording in FIG. 10 and the setting for normal recording in FIG. 11, respectively. The following explanation assumes that a content item selected for timer deletion is recorded in a timer deletion list, which is as an example. Alternatively, the content item selected for timer deletion may be registered as a separate parameter in the list of candidates for deletion, without the creation of additional list.

After the start of recording in FIG. 12, if the recording is continued (normal stop of the recording is not performed) in S1201, the process proceeds to S1202. If the recording is normally stopped with the push of a stop key or the like, the recording is stopped on the spot.

In S1202, the amount of time remaining in the content recording section 107 is obtained. In S1203, it is determined whether the remaining space falls below a preset value. The preset value may be set by the user or may be preset by the recording/reproducing apparatus 115. If the remaining space is sufficient, the process proceeds to S1201 without any special operation, and the recording is continued. If the remaining space is not sufficient, the process proceeds to S1204 to check for the deletion candidate list. If no deletion candidate list exists, it is judged that there are no content items available for deletion, and the recording is stopped. In this case, the recording is stopped, judging that more space is required when the remaining space falls below the threshold value.

Alternatively, the recording may be continued until all the available space is gone, so that the recording is stopped when no available space is left.

If the deletion candidate list exists, the process proceeds to S1205, and the deletion candidate list is retrieved. In S1206, the content item concerned is deleted. Then, the process returns to S1201, and the recording is continued until the end of recording.

Apart from the above examples, a recording/reproducing apparatus or external information may be used as to a method of creating a candidate for deletion, a timing of display, an actual deletion method, and an actual timing of deletion.

In a case where deletion has been made as above, the deletion candidate list may be arranged to be displayed on a monitor for future checking, by retaining the list of candidates for deletion as history information (attribute information) of deleted content items or the like operation.

The present embodiment assumes that history information of the thus deleted content items is retained and displayed at the automatic deletion by the recording/reproducing apparatus 115. This is not only the possibility. Alternatively, the history information of the thus deleted content items may be retained and displayed at the deletion by the user. The history information may be in any form as long as it allows the user to know information on the deleted content items in the future.

The recording/reproducing apparatus 115 may be arranged to perform the following displays, which will be explained with a specific example. At the timer recording, all the storage space required for recording (estimated required space) is calculated on the basis of information on all content items scheduled for recording, and recordable date and time information is displayed. The recordable date and time information is information indicating the date or final date and time until when the recording in the content recording section 107 is possible. The operations for the creation and display of the recordable date and time information are performed by a recordable date and time processing section (recordable date and time processing means: not shown).

As illustrated in FIG. 13, the recordable date and time information can be displayed as follows:

(Display Example 1) Date until when timer recording is possible: December 30

(Display Example 2) Judging from the time currently remaining in HDD, recording is possible until 10:30 p.m. today As a matter of course, these are merely examples.

A screen on which the date or date and time is displayed includes a timer recording setting screen, a direct recording setting screen, power-on/off time screen, and a list display area in which the list is displayed with candidates ordered in descending order according to required space. The date or date and time may be displayed on any one of these screens or may be displayed on all of the screens. Alternatively, it may be displayed on a screen other than the above-listed screens.

Further, in the event of timer recording setting halt/deletion, a pop-up screen may be brought up to display the result of recalculation of the space required for recording (estimated required space).

All the above examples assume that calculation and display are performed on the basis of (i) estimated required space calculated at the timer recording and (ii) the amount of space remaining in the recording medium. However, the list may be displayed during or before normal recording or at other timing.

Embodiment 2

Figure 15:
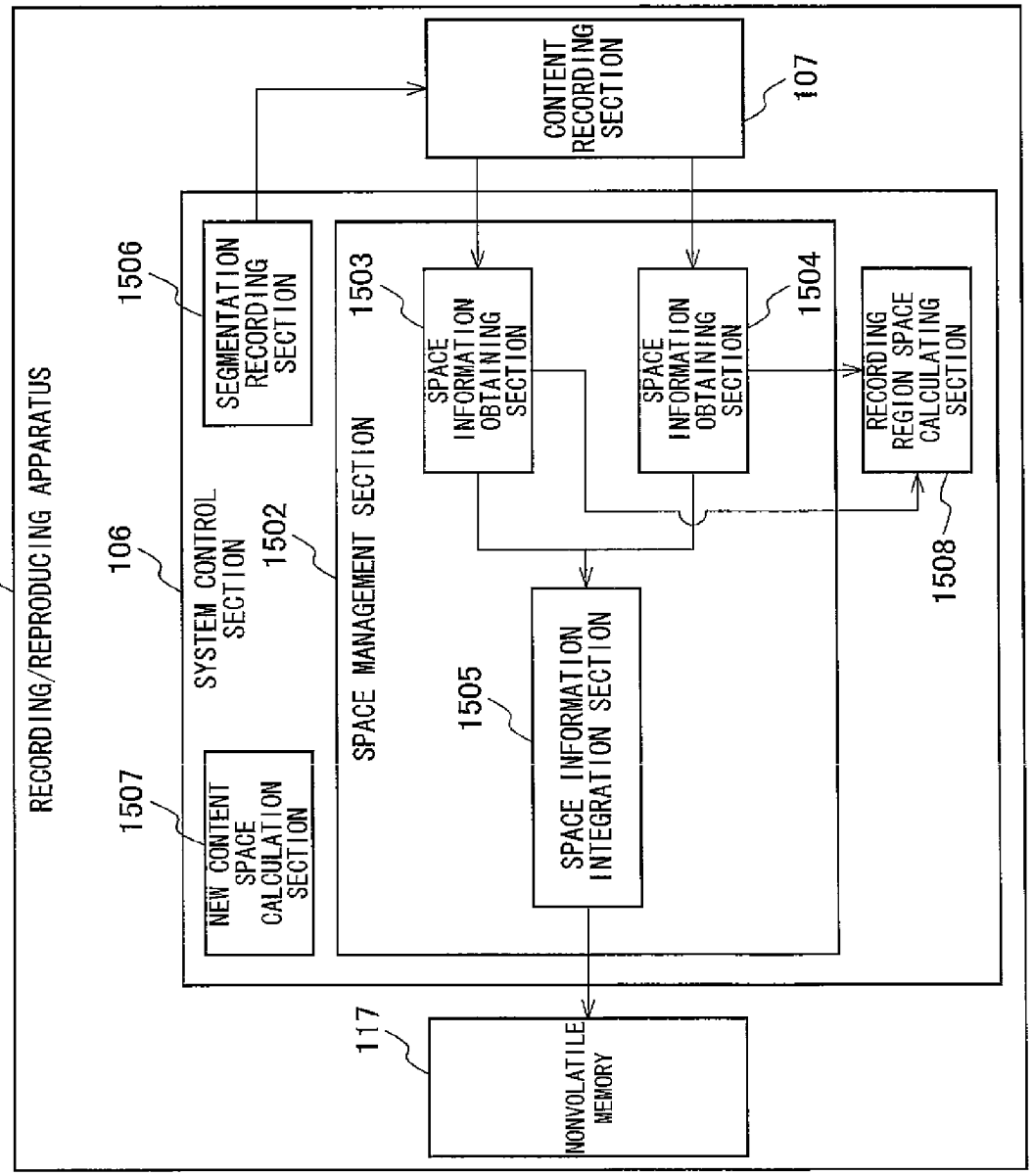
FIG. 15 is a block diagram illustrating an essential configuration of a recording/reproducing apparatus in another embodiment of the present invention.

With reference to FIG. 15 to FIG. 19, the following describes another embodiment of the present invention. FIG. 15 is a block diagram illustrating a recording/reproducing apparatus 1501 of the present embodiment which is different from the recording/reproducing apparatus 115 of Embodiment 1 (FIG. 1) in that the system control section 106 includes a space management section (space management means) 1502, a segmentation recording section (segmentation recording means) 1506, a new content space calculating section (new content space calculating means) 1507, and a recording region space calculating section (recording region space calculating means) 1508. The recording/reproducing apparatus 1501 is arranged in the same manner as in the recording/reproducing apparatus 115 of Embodiment 1 (FIG. 1) except of the aforementioned additional configuration such as the space management section 1502, the segmentation recording section 1506, the new content space calculating section 1507, and the recording region space calculating section 1508. Illustrations and descriptions of the same configuration are omitted here.

As illustrated in FIG. 15, the space management section 1502 is a block for managing and comparing/adjusting space information (information indicative of at least either a storage space or a remaining space) obtained from the content recording section 107. In the present embodiment, the space management section 1502 includes a space information obtaining section 1503, a space information obtaining section 1504, and a space information integration section 1505.

The space information obtaining section 1503 is a block for obtaining space information of a regular region 1600 (described later) of the content recording section 107. The space information obtaining section 1504 is a block for obtaining space information of a secure region 1500 (described later) of the content recording section 107. A plurality of space information obtaining sections may be provided so as to respectively correspond to the regions (the regular region and the secure region in the present embodiment) or a single space information obtaining section may be provided regardless of the number of regions.

The space information integration section 1505 is a block for integrating space information sets obtained by the space information obtaining section 1503 and the space information obtaining section 1504. The space information obtained by integration performed by the space information integration section 1505 is stored in a nonvolatile memory 117. Further, the space information is used in calculating an evaluation function value described later. Further, the space information is displayed in a display 114 through an output section 105 in displaying the deletion candidate list.

The new content space calculating section 1507 is a block for calculating storage spaces required in the recording regions (the regular region and the secure region) described later.

The segmentation recording section 1506 is a block for segmenting data included in the content item into the recording regions (the regular region and the secure region) of the content recording section 107 which are described later.

The recording region space calculating section 1508 is a block for summing storage spaces for data sets included in a content item which are to be recorded in the content recording section 107 so that each sum corresponds to each recording region (the regular region and the secure region) so as to calculate a storage space of each recording region.

In the recording/reproducing apparatus 1501 arranged above, the deletion candidate list is displayed at the start of recording or at the time of presetting to record so as to prompt the user to delete content items as in Embodiment 1. Thus, descriptions thereof are omitted herein.

Figure 16:
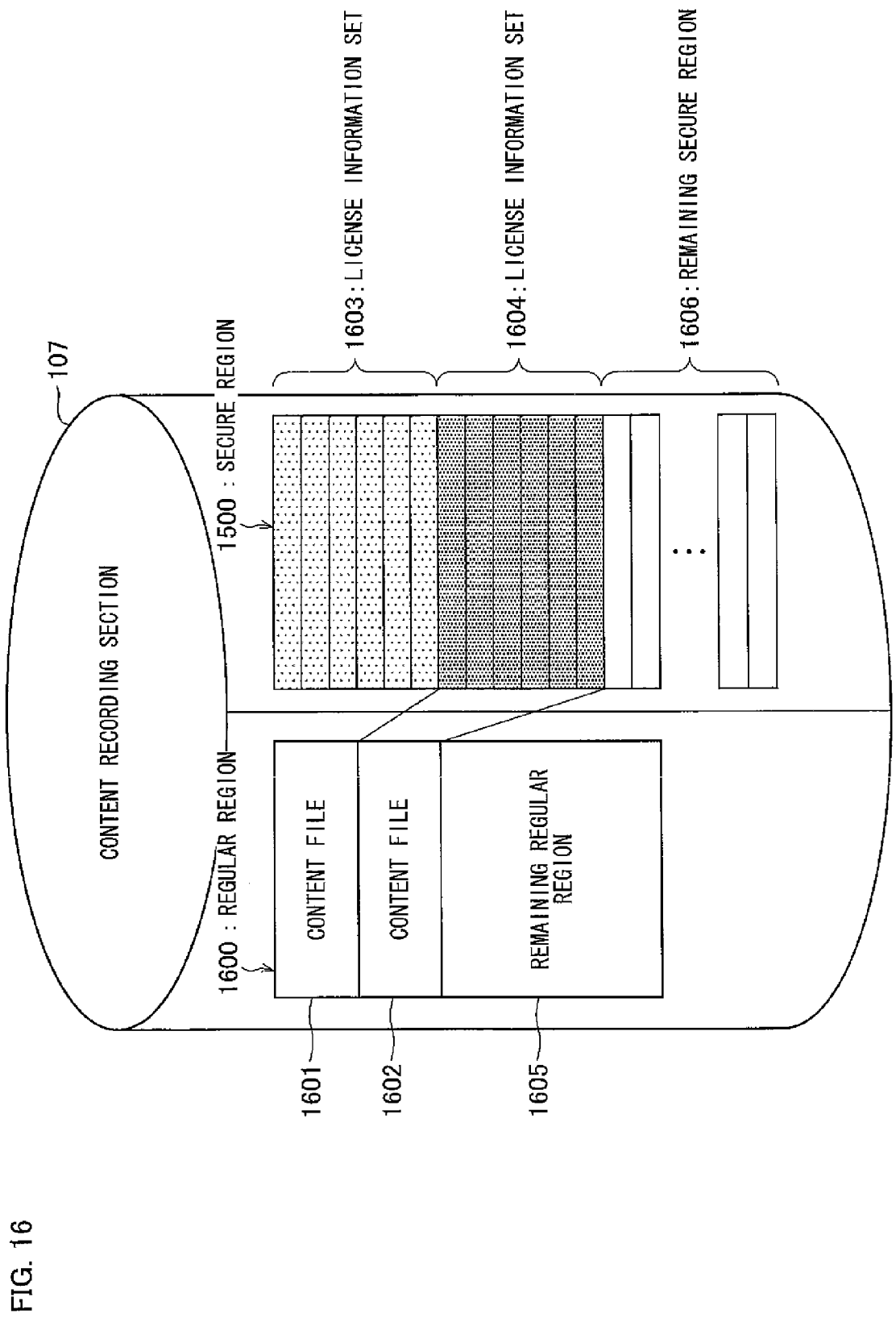
FIG. 16 is a view illustrating data recorded in a content recording section.

Next, data in the present embodiment which is recorded in the content recording section 107 is described as follows with reference to FIG. 16. As illustrated in FIG. 16, the content recording section 107 includes a regular region 1600 for recording data and a secure region 1500 for recording license information. In a case where only data of license-free content is obtained, the obtained data is recorded in the regular region 1600. Further, information obtained with its license purchased through super-distribution or the like is recorded in the secure region 1500. Further, in a case where data having license information, e.g., content having a copyright (digital broadcast program) or similar data is obtained, the license information is recorded in the secure region 1500 and the data is recorded in the regular region 1600.

In the present embodiment, the regular region (data region) 1600 records content data 1601 and content data 1602, and the secure region (license region) 1500 records a license information set 1603 and a license information set 1604 each of which is indicative of a license information set corresponding to each content data.

The following descriptions assume that the license information set increases depending upon a size of the corresponding content data. For example, another license information such as an encryption key is added for each corresponding content data per minute. In the present embodiment, single license information is 1 MB and the secure region can record data up to 50 MB. To the content data 1601 of FIG. 16, license information of 6 MB is assigned.

The following descriptions also assume that: content data can be recorded until a recordable space (bytes) of the regular region 1600 is fully used, and license information of 1 MB can be added for each corresponding content data per minute and can be recorded until 50 MB of license information is recorded.

In a case where bytes are assigned in the foregoing manner, the regular region 1600 has a remaining space (remaining regular region) 1605 and the secure region 1500 has a remaining space (remaining secure region) 1606. Each of them can be represented in bytes.

Herein, a remaining space time indicative of a duration (how many hours and how many minutes) in which content data can be actually recorded in the regular region 1600 can be generally calculated in accordance with a bit rate of "content data to be recorded" relative to remaining bytes. Further, a remaining space time of the secure region can be calculated in accordance with remaining bytes.

(Content Deletion Priority Determination Process)

The recording/reproducing apparatus 1501 performs the following process in determining priorities of content items for deletion. With reference to the deletion candidate list of FIG. 17(*a*), the following describes an example of evaluation function values weighted under respective sorting criteria.

The present embodiment assumes that an evaluation function is defined as follows in a case where sorting criteria (attribute items) are the following five elements: reproduction flag, a regular region in-use space, a secure region in-use space, a time period elapsed from a recording date and time, and level of importance of content item, evaluation function is defined as follows:

$$\text{Evaluation function: } W1 \times V1 + W2 \times V2 + W3 \times V3 + W4 \times V4 + W5 \times V5$$

where W1, W2, W3, W4, and W5 are weighting factors under respective sorting criteria, and V1, V2, V3, V4, and V5 are evaluation values under a single sorting criteria. Assuming that W1, W2, W3, W4, and W5 are assigned weights of 20, 10, 10, 20, and 100, respectively, the evaluation function is represented as follows:

$$\text{Evaluation function: } 20 \times V1 + 10 \times V2 + 10 \times V3 \times 2033 V4 + 100 \times V5$$

According to the following (1) through (5), evaluation values (deletion factor points) in each of the sorting criteria are assigned. These evaluation values are collectively shown in FIG. 18.

(1) If the reproduction flag (V1) is ON, 30 (points) is assigned, and if OFF, 0 (point) is assigned.

(2) If the regular region in-use space (V2) is less than 5 GB, 5 (points) is assigned. If the regular region in-use space (V2) is 5 GB or more and less than 10 GB, 10 (points) is assigned. If the regular region in-use space (V2) is 10 GB or more, 20 (points) is assigned.

(3) If the secure region in-use space (V3) is unused, 0 (point) is assigned. If the secure region in-use space (V3) is 0 MB or more and less than 10 MB, 10 (points) is assigned. If the secure region in-use space (V3) is 10 MB or more, 20 (points) is assigned.

(4) If a time period having elapsed from a recording date and time (V4) is on or before Mar. 31, 2006, 50 (points) is assigned, and if on or after Apr. 1, 2006, 0 (point) is assigned.

(4) If level of importance of content item (V5) is first rank, 5 (points) is assigned, and if second rank and first rank, 10 (points) and 30 (points) are assigned, respectively.

Note that level of importance of content item may be decided by the user or may be decided according to the criteria predetermined by the recording/reproducing apparatus 1501.

In this case, evaluation function values (evaluation points) of the content items A, B, C, D, E are calculated according to the information (attribute information) for each of the content items in FIG. 17(*a*) above. The result of the calculation is given below. The calculation is performed with reference to the content attribute information database DB1 and the point database DB2, both of which are stored in the nonvolatile memory 117.

Content item A: 20×0+10×10+10×0+20×50+100× 10=2100 (points)

Content item B: 20×30+10×5+10×0+20×50+100× 30=4650 (points)

Content item C: 20×0+10×5+10×10+20×0+100×30=3150 (points)

Content item D: 20×30+10×5+10×20+20×0+100× 10=1850 (points)

Content item E: 20×0+10×10+10×20+20×0+100× 5=800 (points)

Thus, as a result of sorting in which higher priorities for deletion are given to content items having higher points of evaluation function values, the content items are prioritized in an order of B, C, A, D, and E, and the result is therefore as in FIG. 17(*b*).

The descriptions assume that, as remaining spaces of the content recording section 107, the regular region 1600 has a remaining space of 2 GB and the secure region 1500 has a remaining space of 15 MB. On such assumption, suppose the following (1) to (5) cases as an example.

(1) In a case of a content item (regular region of 3 GB and secure region of 0 MB) which is to be newly recorded and has no license information, the recording/reproducing apparatus 1501 performs the weighting so that a weight (W2) of the regular region in-use space is larger than other weights due to an insufficient space of the regular region 1600. For example, the weight (W2) of the regular region in-use space is changed from 10 to 500. Further, there is no relevance to the secure region in-use space, so that a weight (W3) of the secure region in-use space is changed from 10 to 0. In this case, evaluation function values of the content items are as follows:

Content item A: 20×0+500×10+0×0+20×50+100×10=7000 (points)

Content item B: 20×30+500×5+0×0+20×50+100×30=7100 (points)

Content item C: 20×0+500×5+0×10+20×0+10×30=5500 (points)

Content D: 20×30+500×5+0×20+20×0+100×10=4100 (points)

Content E: 20×0+500×10+0×20+20×0+100×5=5500 (points)

Thus, as a result of sorting in which higher priorities for deletion are given to content items having higher points of evaluation function values, the content items are prioritized in an order of B, A, C, E, and D, and the result is therefore as in FIG. 19(*a*).

(2) In a case of a content item (regular region of 0 GB and secure region of 20 MB) which is to be newly recorded and has only license information obtained through super-distribution or the like, the recording/reproducing apparatus 1501 performs the weighting so that the weight (W3) of the secure region in-use space is larger than other weights due to an insufficient space of the secure region 1500. For example, the weight (W3) of the secure region in-use space is changed from 10 to 500. Further, there is no relevance to the regular region in-use space 1600, so that the weight (W2) of the regular region in-use space is changed from 10 to 0. In this case, evaluation function values of the content items are as follows:

Content item A: 20×0+0×10+500×0+20×50+100×10=2000 (points)

Content item B: 20×30+0×5+500×0+20×50+100×30=4600 (points)

Content item C: 20×0+0×5+500×10+20×0+100×30=8000 (points)

Content item D: 20×30+0×5+500×20+20×0+100×10=11600 (points)

Content item E: 20×0+0×10+500×20+20×0+100×5=10500 (points)

Thus, as a result of sorting in which higher priorities for deletion are given to content items having higher points of evaluation function values, the content items are prioritized in an order of D, E, C, B, and A, and the result is therefore as in FIG. 19(*b*).

(3) In a case of a content item (regular region of 3 GB and secure region of 5 MB) which is to be newly recorded and has license information, the recording/reproducing apparatus 1501 performs the weighting so that the weight (W2) of the regular region use space is larger than other weights due to an insufficient space of the regular region 1600. For example, the weight (W2) of the regular region in-use space is changed from 10 to 500. Further, there is no relevance to the secure region in-use space 1500, so that the weight (W3) of the secure region in-use space is changed from 10 to 0. In this case, evaluation function values of the content items are as follows:

Content item A: 20×0+500×10+0×0+20×50+100×10=7000 (points)

Content item B: 20×30+500×5+0×0+20×50+100×30=7100 (points)

Content item C: 20×0+500×5+0×10+20×0+100×30=5500 (points)

Content item D: 20×30+500×5+0×20+20×0+100×10=4100 (points)

Content item E: 20×0+500×10+0×20+20×0+100×5=5500 (points)

Thus, as a result of sorting in which higher priorities for deletion are given to content items having higher points of evaluation function values, the content items are prioritized in an order of B, A, C, E, and D, and the result is therefore as in FIG. 19(*a*).

(4) In a case of a content item (regular region of 2 GB and secure region of 20 MB) which is to be newly recorded and has license information, the recording/reproducing apparatus 1501 performs the weighting so that the weight (W3) of the secure region in-use space is larger than other weights due to an insufficient space of the secure region 1500. For example, the weight (W3) of the secure region in-use space is changed from 10 to 500. Further, there is no relevance to the regular region in-use space 1600, so that the weight (W2) of the regular region in-use space is changed from 10 to 0. In this case, evaluation function values of the content items are as follows:

Content item A: 20×0+0×10+500×0+20×50+100×10=2000 (points)

Content item B: 20×30+0×5+500×0+20×50+100×30=4600 (points)

Content item C: 20×0+0×5+500×10+20×0+100×30=8000 (points)

Content item D: 20×30+0×5+500×20+20×0+100×10=11600 (points)

Content item E: 20×0+0×10+500×20+20×0+100×5=10500 (points)

Thus, as a result of sorting in which higher priorities for deletion are given to content items having higher points of evaluation function values, the content items are prioritized in an order of D, E, C, B, and A, and the result is therefore as in FIG. 19(*b*).

(5) In a case of a content item (regular region of 5 GB and secure region of 20 MB) which is to be newly recorded and has license information, the recording/reproducing apparatus 1501 performs the weighting so that the weight (W2) of the regular region in-use space and the weight (W3) of the secure region in-use space are larger than other weights due to an insufficient space of the regular region 1600 and an insufficient space of the secure region 1500. For example, the weight (W2) of the regular region in-use space is changed from 10 to 500, and the weight (W3) of the secure region in-use space is changed from 10 to 500. In this case, evaluation function values of the content items are as follows:

Content item A: 20×0+500×10+500×0+20×50+100×10=7000 (points)

Content item B: 20×30+500×5+500×0+20×50+100×
30=7100 (points)

Content item C: 20×0+500×5+500×10+20×0+100×
30=10500 (points)

Content item D: 20×30+500×5+500×20+20×0+100×
10=14100 (points)

Content item E: 20×0+500×10+500×20+20×0+10×
5=15500 (points)

Thus, as a result of sorting in which higher priorities for deletion are given to content items having higher points of evaluation function values, the content items are prioritized in an order of D, B, C, B, and A, and the result is therefore as in FIG. 19(c).

The evaluation function values change in the foregoing manner, and sorting priorities change their places depending upon statuses. In the foregoing example of the present embodiment, the evaluation values (V1 to V5) are not changed and only the weights (W1 to W5) are changed in a case where the space of each region is insufficient. However, in a case where a shortfall is beforehand found out for example, it may be so arranged that an evaluation value of a content item which requires a space less than a space corresponding to the shortfall is 0 and an evaluation value of a content item which requires a space equal to or more than a space corresponding to the shortfall is 1 so as to carry out the weighting under this condition.

Further, in the foregoing example, the evaluation function values are calculated in accordance with the five elements: reproduction flag, a regular region in-use space, a secure region in-use space, a time period elapsed from a recording date and time, and level of importance of content item. However, the calculation is not limited to this. It may be so arranged that another evaluation function obtained by arbitrarily setting criteria and the number of the criteria is used to calculate each evaluation function value as long as the calculation is based on information corresponding to each content item.

Further, in the foregoing example, the recording/reproducing apparatus 1501 performs the weighting, but the weighting is not limited to this arrangement and the weighting may be performed by the user.

Further, in the foregoing example, each of the sorting criteria is weighted, but it may be so arranged that the weighting is not performed, that is, each of W1, W2, W3, W4, and W5 may be 1.

Further, in the foregoing description, a necessary region is weighted so as to be 50 times larger, particularly, an unnecessary region is weighted so as to be 0 times larger, as the sorting criteria, but the sorting criteria is not limited to this arrangement, and the weighting may be variable depending upon statuses or operations of the user.

Further, in the above examples, the evaluation function is realized by a linear function sum of the evaluation values of the respective sorting criteria. However, this is not only the possibility. For example, the evaluation function may be realized by a high-dimensional function, or may be realized by multiplication of evaluation values of the respective sorting criteria.

Still further, the updating may be performed at any timing(s), for example, at the start of reproducing the content item B, after the completion of reproduction, and/or at the list display, and the timings of the updating may be combined in any way.

The following will describe a method for actually displaying the thus created deletion candidate list in view of the space.

In displaying the deletion candidate list, the recording/reproducing apparatus 1501 does not simply display a list of sorted content items but displays content items required to be deleted to free up a space corresponding to a shortfall which is estimated in accordance with preset information or the like, so as to allow the user to easily select a content item. The display is performed as in Embodiment 1. Note that, a size required for recording, a size corresponding to the shortfall, and a size occupied by the recorded content item are displayed. For example, the aforementioned sizes of the secure region 1500 and the aforementioned sizes of the regular region 1600 may be displayed, or the aforementioned sizes of a smaller region may be displayed. Alternatively, it may be so arranged that the remaining space (necessary space) is not displayed.

Also typical flows of displaying and deleting a candidate for deletion by using the above-described method of creating the deletion candidate list, displaying, and selective deletion are the same as in Embodiment 1, so that descriptions thereof are omitted.

Each of blocks of the recording/reproducing apparatuses 115 and 1501 described above, particularly, the system control section 106 may be realized by hardware logic or by software using a processor such as a CPU (central processing unit) as follows.

That is, each of the recording/reproducing apparatuses 115 and 1501 includes: a CPU which executes a control program realizing the functions; a ROM (read only memory) in which the program is stored; a RAM (random access memory) which develops the program; a storage device (recording medium) such as a memory in which the program and various kinds of data are stored; and the like. Further, the object of the present invention can be achieved as follows: a recording medium for computer-readably storing a program code (an execute form program, intermediate code program, or source program) of the control program of the recording/reproducing apparatus 115 which is software for implementing the aforementioned functions is provided to the recording/reproducing apparatus 115, and a computer (or CPU and MPU) reads out the program code stored in the recording medium so as to implement the program, thereby achieving the object of the present invention.

Examples of the recording medium which satisfies these conditions include: tapes, such as magnetic tape and cassette tape; disks including magnetic disks, such as floppy disks (registered trademark) and hard disk, and optical disks, such as CD-ROMs, magnetic optical disks (MOs), mini disks (MDs), digital video disks (DVDs), and CD-Rs; cards, such as IC card (including memory cards) and optical cards; and semiconductor memories, such as mask ROMs, EPROMs, EEPROMs, and flash ROMs.

Further, it may be so arranged that: the recording/reproducing apparatus 115 is made connectable to communication networks, and the program code is supplied via the communication networks. The communication networks are not limited to a specific means. Specific examples of the communication network include Internet, intranet, extranet, LAN, ISDN, VAN, a CATV communication network, a virtual private network, a telephone line network, a mobile communication network, a satellite communication network, and the like. Further, a transmission medium constituting the communication network is not particularly limited. Specifically, it is possible to use a wired line such as a line in compliance with IEEE1394 standard, a USB line, a power line, a cable TV line, a telephone line, an ADSL line, and the like, as the transmission medium. Further, it is possible to use (i) a wireless line utilizing an infrared ray used in IrDA and a remote controller, (ii) a wireless line which is in compliance with Bluetooth standard (registered trademark) or IEEE802.11 wireless standard, and (iii) a wireless line utilizing HDR, a mobile phone network, a satellite line, a ground wave digital network, and the like, as the transmission medium. Note that, the present invention can be realized by a computer data signal which is realized by electronic transmission of the program code and which is embedded in a carrier wave.

As described above, in order to solve the foregoing problems, a recording apparatus according to the present invention, calculating a storage space required for recording a new content item and deleting a content item having been recorded in a recording medium so as to record the new content item in a case where a storage space of the recording medium is insufficient, said recording apparatus comprising: a storage section for storing (i) a content attribute database in which the content item having been recorded in the recording medium and attribute information sets of plural attribute items of the content item are associated with each other and (ii) a point database in which plural deletion factors having been set for each attribute item and deletion factor points are associated with each other; and point calculating means for extracting attribute information sets for each content item from the content attribute database and extracting deletion factor points associated with deletion factors corresponding to the extracted attribute information sets from the point database so as to calculate evaluation points in accordance with the extracted deletion factor points.

Further, in order to solve the foregoing problems, a method according to the present invention for controlling a recording apparatus, calculating a storage space required for recording a new content item and deleting a content item having been recorded in a recording medium so as to record the new content item in a case where a storage space of the recording medium is insufficient, said recording apparatus including a storage section for storing (i) a content attribute database in which the content item having been recorded in the recording medium and attribute information sets of plural attribute items of the content item are associated with each other and (ii) a point database in which plural deletion factors having been set for each attribute item and deletion factor points are associated with each other, said method comprising a point calculation step in which attribute information sets for each content item are extracted from the content attribute database and deletion factor points associated with deletion factors corresponding to the extracted attribute information sets are extracted from the point database so as to calculate evaluation points in accordance with the extracted deletion factor points.

In addition to the above arrangement, the recording apparatus according to the present invention may be arranged so that the point calculating means weights the deletion factor points, having been extracted, in accordance with weights having been set in attribute items of deletion factors corresponding to the deletion factor points, so as to calculate evaluation points in accordance with the deletion factor points having been weighted.

According to the above arrangement, evaluation point calculation for each content item is performed in accordance with a plurality of weighted deletion factor points obtained by weighting the extracted plural deletion factor points with weights having been set in attribute items of deletion factors corresponding to the deletion factor points. Thus, even if a point is assigned to a deletion factor in advance, it is possible to calculate evaluation points with weights of the attribute items taken into consideration. If the user can set the weights for the attribute items, evaluation points based on the attribute items are calculated according to user's preference.

In addition to the above arrangement, the recording apparatus according to the present invention may be arranged so as to further comprise: deletion order determination means for determining a deletion order, in which content items having been recorded in the recording medium are deleted, in accordance with the evaluation points having been calculated by the point calculating means; display processing means for displaying content attribute information sets which are disposed in an order based on the deletion order having been determined by the deletion order determination means; and deletion processing means for receiving a deletion instruction from a user so as to delete the content items having been recorded in the recording medium.

According to the above arrangement, the deletion order determination means determines a deletion order, in which content items having been recorded in the recording medium are deleted, in accordance with the calculated evaluation points. Further, the display processing means displays content attribute information sets which are disposed in an order based on the deletion order having been determined by the deletion order determination means. Further, if a deletion instruction is given by the user, the deletion processing means deletes content items having been recorded in the recording medium.

Thus, the user can confirm the content attribute information sets which are disposed in an order based on the deletion order having been determined by the deletion order determination means, and the user can reserve a space required in the recording medium through appropriate operation by giving an instruction to delete content items in accordance with the deletion order. Further, the deletion order is determined, so that the user can easily find out a favorable deletion order. As a result, the user does not have to have trouble in selecting content items which should be deleted to reserve a necessary space.

Note that, in displaying attribute information sets of content items disposed in the determined deletion order, these attribute information sets may be displayed in a single window or may be displayed in a plurality of windows. Alternatively, it may be so arranged that the user operates to cause the attribute information sets to be sequentially displayed one by one in a single window or every plural attribute information sets to be displayed in a single window.

In addition to the arrangement, the recording apparatus according to the present invention may be arranged so as to further comprise: deletion order determination means for determining a deletion order, in which content items having been recorded in the recording medium are deleted, in accordance with the evaluation points having been calculated by the point calculating means; and deletion processing means for deleting the content items having been recorded in the recording medium in accordance with the deletion order having been determined by the deletion order determination means.

According to the above arrangement, the deletion order determination means determines a deletion order, in which content items having been recorded in the recording medium are deleted, in accordance with the evaluation points having been calculated by the point calculating means. Further, the deletion processing means deletes content items, having been recorded in the recording medium, in accordance with the determined order.

Thus, the content items are deleted in accordance with the deletion order having been determined on the basis of the evaluation points without necessity for the user to carry out any operation, so that the user does not have to carry out any operations. Further, if the user determines the deletion factor points in advance, the deletion order is determined according to user's preference. This makes it possible to prevent unexpected content items from being deleted.

Note that, content items may be deleted in presetting recording of a new content item. Alternatively, it may be so arranged that the content items are retained as deletion candidates and the retained content items are deleted when the space of the recording medium becomes actually insufficient.

In addition to the above arrangement, the recording apparatus according to the present invention may be arranged so that the display processing means displays attribute information sets of content items which should be essentially deleted to reserve a space required for recording a new content item.

According to the above arrangement, there are displayed attribute information sets of content items which should be essentially deleted to reserve a space required for recording a new content item. Thus, attribute information sets of unnecessary content items are not displayed, so that the user does not have to have trouble in selecting content items which should be deleted to reserve a necessary space.

In addition to the above arrangement, the recording apparatus according to the present invention may be arranged so as to further comprise dubbing preset entry means for allowing dubbing of a new content item to be preset, wherein the deletion order determination means does not give a deletion order to the content item, of which dubbing has been preset, so that the deletion processing means does not delete the content item.

According to the above arrangement, a deletion order is not given to a content item of which dubbing has been preset. Thus, the content item of which dubbing has been preset by the user can be set as a content item which should not be deleted. This makes it possible to prevent a content item unexpected by the user from being deleted.

In addition to the above arrangement, the recording apparatus according to the present invention may be arranged so as to further comprise content-to-be-deleted attribute information retention means for retaining content attribute information of a content item, which is to be deleted, into the storage section in deleting the content item.

According to the above arrangement, content attribute information of a content item is retained into the storage section in deleting the content item. Thus, the content attribute information having been deleted are displayed so that the user can confirm the deleted content items when the user wants to confirm. For example, the user can confirm that the content item has been actually deleted without dubbing or moving, which results in convenience for the user. Further, attribute information sets of content items disposed in a deletion order are displayed so that the user can refer to content items, having been deleted, in selecting a content item which the user is to actually delete. Further, in determining the deletion order, the user can determine the deletion order with reference to the attribute information sets of the content items having been deleted.

Further, in addition to the above arrangement, the recording apparatus according to the present invention may be arranged so that: in a case where there are plural content items to be newly recorded, the display processing means displays, at the same time, (i) content attribute information having been recorded in the recording medium which content attribute information corresponds to a space required for recording a content item to be recorded in a specific recording period out of the plural content items and (ii) content attribute information which is required for recording new content items other than the content item to be recorded in a specific recording period and which is recorded in the recording medium.

According to the above arrangement, in a case where there are plural content items to be newly recorded, there are simultaneously displayed (i) content attribute information having been recorded which content attribute information corresponds to a space required for recording a content item to be recorded in a specific recording period and (ii) content attribute information which is required for recording new content items other than the content item to be recorded in a specific recording period and which is recorded in the recording medium.

Herein, the "specific recording period" is a time period, e.g., one-day period, one-week period, one-month period, and the like, but the specific recording period is not limited to them. If the simultaneous display is performed, the user can simultaneously find out (i) a content item which is to be deleted and corresponds to a space required for recording a content item to be recorded in a specific recording period and (ii) a content item which is to be deleted and is required for recording new content items other than the content item to be recorded in a specific recording period. As a result, the user does not have to have trouble in selecting a content item which is to be deleted to reserve a space required for recording a content item to be recorded in a specific recording period.

Further, in addition to the above arrangement, the recording apparatus according to the present invention may be arranged so that: in a case where there are plural content items to be newly recorded, the display processing means not only displays content attribute information having been recorded in the recording medium which content attribute information corresponds to a space required for recording a content item to be recorded in a specific recording period out of the plural content items but also displays content attribute information which is required for recording new content items other than the content item to be recorded in a specific recording period and which is recorded in the recording medium, that content attribute information and this content attribute information being displayed at the same time or by stages.

According to the above arrangement, in a case where there are plural content items to be newly recorded, not only content attribute information having been recorded which content attribute information corresponds to a space required for recording a content item to be recorded in a specific recording period but also content attribute information which is required for recording new content items other than the content item to be recorded in a specific recording period and which is recorded is displayed so that that content attribute information and this content attribute information are displayed at the same time or by stages.

Thus, the user can find out, at the same time or by stages, not only a content item which is to be deleted and corresponds to a space required for recording a content item to be recorded in a specific recording period but also a content item which is to be deleted and is required for recording new content items other than the content item to be recorded in a specific recording period. As a result, the user does not have to have trouble in selecting a content item which is to be deleted to reserve a space required for recording a content item to be recorded in a specific recording period.

Further, in order to solve the foregoing problems, a recording apparatus according to the present invention, which allows recording of a new content item to be preset and calculates a storage space required for recording the new content item, said recording apparatus deleting a content item recorded in a recording medium so as to record the new content item in the recording medium in a case where a storage space of the recording medium is insufficient, said recording apparatus comprising recordable date and time processing means for generating and displaying recordable date and time information indicative of a date and time on which preset recording of the content item will be actually executed.

According to the above arrangement, there is displayed recordable date and time information indicative of a date and time on which preset recording of the content item will be actually executed. Thus, even if the user presets recording of a content item which requires a space exceeding an actual recordable space of the recording medium, the user can confirm the information indicative of a date and time on which preset recording of the content item will be actually executed. In this manner, the user can easily confirm how long the content item of which recording has been preset can be recorded. This makes it possible to appropriately delete a content item.

Further, in addition to the above arrangement, the recording apparatus according to the present invention may be arranged so that the recordable date and time processing means displays the recordable date and time information in an attribute information display region in which attribute information sets of content items are displayed so as to be disposed in a deletion order.

According to the above arrangement, the recordable date and time information is displayed in an attribute information display region in which attribute information sets of content items are displayed so as to be disposed in a deletion order. Such display allows the user to easily refer to the recordable date and time information in confirming attribute information sets of content items disposed in the deletion order. Thus, the user can easily determine a content item to be deleted with reference to the recordable date and time information. As a result, the user can delete the target content item in a simple manner.

In addition to the above arrangement, the recording apparatus according to the present invention may be arranged so that the recordable date and time processing means updates the recordable date and time information every time a space of the recording medium becomes in sufficient.

According to the above arrangement, the recordable date and time information is updated every time a space of the recording medium becomes insufficient, so that can surely delete the target content item with accurate information. Further, also in case of deleting more content items, it is possible to promptly reserve a necessary space in the recording medium.

Further, the recording apparatus may be realized by a computer. In this case, (I) a recording apparatus control program which causes a computer to function as the means of the recording apparatus so as to realize the aforementioned recording apparatus with a computer and (II) a computer-readable recording medium in which the aforementioned recording apparatus control program is recorded fall under the scope of the present invention.

According to these arrangements, the recording apparatus control program is read and executed by a computer, thereby realizing the same effect as in the aforementioned recording apparatus.

Further, the present invention may be expressed as a recording/reproducing apparatus arranged in the following manner. That is, the recording/reproducing apparatus comprises: a list generation section for selecting deletion candidate titles in accordance with a condition and for generating a list of the deletion candidate titles; a list display section for calculating a region required for recording a content item and for displaying a list of the deletion candidates rearranged in accordance with a candidate order corresponding to the required region; and a deletion title selection section for selecting a title, which is to be actually deleted, from deletion titles displayed in the list display section and referred to by the user (for deleting a finally selected title), wherein the list to be displayed is generated by automatically combining plural conditions so as to be displayed or the list to be displayed is generated by combining plural conditions under which the user sets priorities so as to be displayed thereby deleting the selected title.

Further, the present invention may be expressed as a recording/reproducing apparatus arranged in the following manner. That is, a recording/reproducing apparatus comprises: a list generation section for selecting deletion candidate titles in accordance with a specific condition and for generating a list of the deletion candidate titles; a list display section for calculating a region required for recording a content item and for displaying a list of the deletion candidates rearranged in accordance with a candidate order corresponding to the required region; and a deletion title selection section for selecting a title, which is to be actually deleted, from deletion titles displayed in the list display section and referred to by the user (for deleting a finally selected title), wherein the list to be displayed is generated by automatically combining plural conditions so as to be displayed or the list to be displayed is generated by combining plural conditions under which the user sets priorities so as to be displayed thereby registering the selected title as a deletion candidate.

Further, in addition to the above arrangement, the recording/reproducing apparatus may be arranged so that the required region of the recording medium is specified in accordance with broadcast information in digital broadcast or the like.

Further, in addition to the above arrangement, the recording/reproducing apparatus may be arranged so that the required region of the recording medium is specified in accordance with inputted information.

Further, in addition to the above arrangement, the recording/reproducing apparatus may be arranged so that a title having been registered as a deletion candidate is deleted at any timing.

Further, in addition to the above arrangement, the recording/reproducing apparatus may be arranged so that a title having been registered as a deletion candidate is automatically deleted.

Further, in addition to the above arrangement, the recording/reproducing apparatus may be arranged so that the list display section displays only candidates corresponding to the required region.

Further, in addition to the above arrangement, the recording/reproducing apparatus may be arranged so that the list display section displays candidates corresponding to the required region and other deletion candidates at the same time.

Further, in addition to the above arrangement, the recording/reproducing apparatus may be arranged so that the list display section displays not only candidates corresponding to the required region but also other deletion candidates at the same time or by stages.

Further, in addition to the above arrangement, the recording/reproducing apparatus may be arranged so that the display section displays a plurality of candidates corresponding to the required region at the same time.

Further, in addition to the above arrangement, the recording/reproducing apparatus may be arranged so that the list generation section generates the list in accordance with not a title of a content item which is to be dubbed by reservation but candidate titles other than that title.

Further, the present invention may be expressed as a recording/reproducing apparatus arranged in the following manner. That is, the recording/reproducing apparatus retains information log concerning a deleted title.

Further, in addition to the above arrangement, the recording/reproducing apparatus may be arranged so that the retained information concerning the deleted title is displayed in an output device such as a monitor.

Further, in addition to the above arrangement, the recording/reproducing apparatus may be arranged so as to calculate the required region and so as to display a date on which a content item can be recorded or a date and hour in which a content item can be recorded.

Further, in addition to the above arrangement, the recording/reproducing apparatus may be arranged so as to calculate the required region and so as to display a date on which a content item can be recorded or a date and hour in which a content item can be recorded in a reservation setting window, a direct recording setting window, or a power ON/OFF screen.

Further, in addition to the above arrangement, the recording/reproducing apparatus may be arranged so as to calculate the required region and so as to cause the list display section for displaying a list of the deletion candidates rearranged in accordance with a candidate order corresponding to the required region to display a date on which a content item can be recorded or a date and hour in which a content item can be recorded.

Further, in addition to the above arrangement, the recording/reproducing apparatus may be arranged so as to suitably recalculate the required region and so as to display an updated date on which a content item can be recorded or an updated date and hour in which a content item can be recorded.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is applicable to a recording apparatus, a recording/reproducing apparatus, and the like, each of which can record digital broadcast and can delete information, having been recorded, so as to secure a storage space. Further, the present invention is applicable not only to a recorder but also to a personal computer and the like each of which can record digital broadcast and can delete information, having been recorded, so as to secure a storage space.

The invention claimed is:

1. A recording apparatus, calculating a storage space required for recording a new content item and deleting a content item having been recorded in a recording medium so as to record the new content item in a case where a storage space of the recording medium is insufficient, said recording apparatus comprising:

a storage section for storing (i) a content attribute database in which the content item having been recorded in the recording medium and attribute information sets of plural attribute items of the content item are associated with each other and (ii) a point database in which plural deletion factors having been set for each attribute item and deletion factor points are associated with each other;

point calculating means for extracting attribute information sets for each content item from the content attribute database and extracting deletion factor points associated with deletion factors corresponding to the extracted attribute information sets from the point database so as to calculate evaluation points in accordance with the extracted deletion factor points; and deletion order determination means for determining a deletion order, in which content items having been recorded in the recording medium are deleted, in accordance with the evaluation points having been calculated by the point calculating means, wherein the recording medium includes (a) a secure region for recording license information and (b) a regular region for recording regular data, the license information and the regular data being included in a content item, and the license information is encryption key information for each predetermined recording time of the regular data corresponding to the license information, and each of an in-use space used to record the license information in the secure region and an in-use space used to record the regular data in the regular region is set as the deletion factor.

2. The recording apparatus as set forth in claim 1, further comprising segmentation recording means for segmenting information of a content item into license information and regular information and regular data and recording the license information in the secure region and recording the regular data in the regular region.

3. The recording apparatus as set forth in claim 1, further comprising new content space calculating means for calculating a storage space required for recording a new content item in each of the secure region and the regular region.

4. The recording apparatus as set forth in claim 1, further comprising recording region space calculating means for summing storage spaces for license information sets of content items recorded in the recording medium so as to calculate a storage space in the secure region and summing storage spaces for regular data sets of the content items recorded in the recording medium so as to calculate a storage space of the regular regions.

5. The recording apparatus as set forth in claim 1, wherein: in a case where there is a recording region whose storage space is insufficient in recording a new content item, the point calculating means increases a weight of a deletion factor which is the insufficient storage space of the recording region.

6. The recording apparatus as set forth in claim 1, wherein the point calculating means weights the deletion factor points, having been extracted, in accordance with weights having been set in attribute items of deletion factors corresponding to the deletion factor points, so as to calculate evaluation points in accordance with the deletion factor points having been weighted.

7. The recording apparatus as set forth in claim 1, further comprising:

display processing means for displaying content attribute information sets which are disposed in an order based on the deletion order having been determined by the deletion order determination means; and deletion processing means for receiving a deletion instruction from a user so as to delete the content items having been recorded in the recording medium.

8. The recording apparatus as set forth in claim 7, wherein the display processing means displays attribute information sets of content items which should be essentially deleted to reserve a space required for recording a new content item.

9. The recording apparatus as set forth in claim 7, further comprising dubbing preset entry means for allowing dubbing of a new content item to be preset, wherein
the deletion order determination means does not give a deletion order to the content item, of which dubbing has been preset, so that the deletion processing means does not delete the content item.

10. The recording apparatus as set forth in claim 7, wherein:
in a case where there are plural content items to be newly recorded,
the display processing means displays, at the same time, (i) content attribute information having been recorded in the recording medium which content attribute information corresponds to a space required for recording a content item to be recorded in a specific recording period out of the plural content items and (ii) content attribute information which is required for recording new content items other than the content item to be recorded in a specific recording period and which is recorded in the recording medium.

11. The recording apparatus as set forth in claim 7, wherein:
in a case where there are plural content items to be newly recorded,
the display processing means not only displays content attribute information having been recorded in the recording medium which content attribute information corresponds to a space required for recording a content item to be recorded in a specific recording period out of the plural content items
but also displays content attribute information which is required for recording new content items other than the content item to be recorded in a specific recording period and which is recorded in the recording medium, that content attribute information and this content attribute information being displayed at the same time or by stages.

12. The recording apparatus as set forth in claim 1, further comprising:
deletion processing means for deleting the content items having been recorded in the recording medium in accordance with the deletion order having been determined by the deletion order determination means.

13. The recording apparatus as set forth in claim 1, further comprising content-to-be-deleted attribute information retention means for retaining content attribute information of a content item, which is to be deleted, into the storage section in deleting the content item.

14. The recording apparatus as set forth in claim 1, further comprising recordable date and time processing means for allowing recording of a new content item to be preset and generating and displaying recordable date and time information indicative of a date and time on which preset recording of the content item will be actually executed.

15. The recording apparatus as set forth in claim 14, wherein the recordable date and time processing means displays the recordable date and time information in an attribute information display region in which attribute information sets of content items are displayed so as to be disposed in a deletion order.

16. The recording apparatus as set forth in claim 14, wherein the recordable date and time processing means updates the recordable date and time information every time a space of the recording medium becomes insufficient.

17. The recording apparatus as set forth in claim 1, further comprising:
space information obtaining means for obtaining a space information set which corresponds to the secure region and has information indicative of at least either a storage space or a remaining space and for obtaining a space information set which corresponds to the regular region and has information indicative of at least either a storage space or a remaining space;
space information integration means for integrating the space information set of the secure region and the space information set of the regular region; and
display means for displaying space information obtained by integrating the space information sets.

18. A method for controlling a recording apparatus, calculating a storage space required for recording a new content item and deleting a content item having been recorded in a recording medium so as to record the new content item in a case where a storage space of the recording medium is insufficient,
said recording apparatus including a storage section for storing (i) a content attribute database in which the content item having been recorded in the recording medium and attribute information sets of plural attribute items of the content item are associated with each other and (ii) a point database in which plural deletion factors having been set for each attribute item and deletion factor points are associated with each other,
said method comprising:
a point calculation step in which attribute information sets for each content item are extracted from the content attribute database and deletion factor points associated with deletion factors corresponding to the extracted attribute information sets are extracted from the point database so as to calculate evaluation points in accordance with the extracted deletion factor points; and
a deletion order determination step for determining a deletion order, in which content items having been recorded in the recording medium are deleted, in accordance with the evaluation points having been calculated, wherein
the recording medium includes (a) a secure region for recording license information and (b) a regular region for recording regular data, the license information and the regular data being included in a content item, and
the license information is encryption key information for each predetermined recording time of the regular data corresponding to the license information, and
each of an in-use space used to record the license information in the secure region and an in-use space used to record the regular data in the regular region is set as the deletion factor.

19. A non-transitory computer-readable recording medium in which a recording apparatus control program for causing the recording apparatus as set forth in claim 1 to operate, said recording apparatus control program causing a computer to function as the means of the recording apparatus, is recorded.

* * * * *